(12) United States Patent
Croll et al.

(10) Patent No.: US 9,524,494 B2
(45) Date of Patent: Dec. 20, 2016

(54) SYSTEMS AND METHODS FOR NAVIGATING A CALENDAR

(75) Inventors: Brian Croll, Los Altos, CA (US); Viktor Miladinov, Palo Alto, CA (US)

(73) Assignee: APPLE INC., Cupertino, CA (US)

(*) Notice: Subject to any disclaimer, the term of this patent is extended or adjusted under 35 U.S.C. 154(b) by 77 days.

(21) Appl. No.: 13/366,228

(22) Filed: Feb. 3, 2012

(65) Prior Publication Data
US 2013/0205245 A1 Aug. 8, 2013

(51) Int. Cl.
*G06F 3/048* (2013.01)
*G06Q 10/00* (2012.01)
*G06Q 10/10* (2012.01)

(52) U.S. Cl.
CPC .................... *G06Q 10/109* (2013.01)

(58) Field of Classification Search
CPC ........ G06F 3/0481; G06F 9/4443; G09G 5/14; G09G 2340/02; G09G 2340/12
USPC .......................................... 715/781
See application file for complete search history.

(56) References Cited

U.S. PATENT DOCUMENTS

| | | | |
|---|---|---|---|
| 7,710,832 B2* | 5/2010 | Forstall et al. | 368/29 |
| 8,285,835 B1* | 10/2012 | Deolasee | G06F 11/324 709/224 |
| 8,522,163 B2 | 8/2013 | Relyea et al. | |
| 2006/0010405 A1* | 1/2006 | Haitani et al. | 715/864 |
| 2006/0236269 A1* | 10/2006 | Borna | 715/963 |
| 2008/0244425 A1* | 10/2008 | Kikin-Gil et al. | 715/764 |
| 2009/0228815 A1 | 9/2009 | Dellinger et al. | |
| 2009/0282361 A1 | 11/2009 | Cortright | |
| 2012/0030194 A1 | 2/2012 | Jain | |
| 2012/0240055 A1 | 9/2012 | Webber | |
| 2013/0201218 A1 | 8/2013 | Cates et al. | |

OTHER PUBLICATIONS

Johnson, W.J. and Weber, O.W. "Point-to-Point Navigation through the Electronic Calendar." Electronically published to IP.com on Mar. 26, 2005, http://ip.com/IPCOM/000111370.*
Microsoft Outlook 2010, published by Microsoft on Jul. 15, 2010.*
"Keyboard shortcuts for Outlook", published at https://support.office.com/en-au/article/Keyboard-shortcuts-for-Outlook-3cdeb221-7ae5-4c1d-8c1d-9e63216c1efd, retrieved from the web on Jun. 19, 2015.*
Non-Final Office Action for U.S. Appl. No. 13/366,230, mailed Nov. 20, 2013, 37 pages.
Notice of Allowance for U.S. Appl. No. 13/366,230, mailed Jun. 20, 2014, 10 pages.

* cited by examiner

*Primary Examiner* — Doon Chow
*Assistant Examiner* — Shourjo Dasgupta
(74) *Attorney, Agent, or Firm* — Morgan, Lewis & Bockius LLP

(57) ABSTRACT

Methods, systems, and graphical user interfaces are provided for navigating a calendar application executing on a computer system. Aspects of scrolling by day and scrolling by week are combined into a hybrid approach that includes advantages of both. For example, the week can be displayed with the current day first (e.g. in the left most column), thereby providing a more relevant view to a user. Then, when a user selects to move forward or backward, the next or previous full week (i.e. starting with a designated day, such as Sunday or Monday) can be displayed. And, when a user forward through the current day (or other selected day), the week view can stop with the selected day displayed first, to give a user a view of the next set of days following the selected day.

18 Claims, 17 Drawing Sheets

SYSTEMS AND METHODS FOR NAVIGATING A CALENDAR

CROSS-REFERENCES TO RELATED APPLICATIONS

This application is related to commonly owned and concurrently filed U.S. patent application Ser. No. 13/366,230, filed Feb. 3, 2012, the disclosure of which is incorporated by reference in its entirety.

BACKGROUND

The present application relates generally to a calendar application running on a computer system, and more specifically to navigating how the calendar will move forward and backward while in a week view.

Typical calendar applications allow a user to view a week at one time. The week view is a fixed display in that the week is always displayed with Sunday being first or Monday first, if only a workweek is displayed. These calendar applications often have two methods of navigating in the week view: 1) scroll one week at a time or 2) scroll one day at a time. Both the fixed display and limited navigation make it difficult to see relevant events on a same page or easily navigate to a desired view.

Therefore, it is desirable to have improved methods, systems, and graphical user interfaces for navigating in a week view of a calendar.

BRIEF SUMMARY

Embodiments provide methods, systems, and graphical user interfaces for navigating a calendar application executing on a computer system. For example, a navigation object can be used to advance the days displayed in a week view of a calendar window until a selected day (e.g. today) or a start day of a week is displayed first in the sequence of days.

According to one embodiment, a method of navigating a calendar application executing on a computer system is provided. A first week is displayed in a calendar window on a display of the computer system. A week is a set of N sequential days with N being an integer greater than two. A selection of a day in the first week is received, where the selected day is not displayed first in the sequence of N days in the calendar window. A user provides input to advance the calendar window by a week. The calendar window advances by less than N days such that the selected day is displayed first in the sequence of N days in the calendar window.

According to another embodiment, a graphical user interface (GUI) is provided for navigating a calendar application executing on a computer system, the GUI being generated by one or more processors of the computer system. A calendar window has in a week view that displays events for N sequential days, with N being an integer greater than two. The week view has a boundary day that defines a start of any week. A first of one or more navigation objects is used for navigating which days are displayed in the calendar window while in the week view. The first navigation object is configured to advance the days displayed in the calendar window until the boundary day is displayed first in the sequence of N days. The first navigation object is also configured to advance the days displayed in the calendar window until a selected day is displayed first in the sequence of N days. The boundary day and the selected day are independently determined.

Other embodiments are directed to systems and computer readable media associated with methods described herein.

A better understanding of the nature and advantages of the present invention may be gained with reference to the following detailed description and the accompanying drawings.

DETAILED DESCRIPTION

Embodiments provide new features to a calendar application. One feature relates to indicating events that are off-screen (outside of a viewable time range). The indication uses an event object that is used to represent an event when the event is within the viewable time range. Such a re-use of the event object can help relay additional information besides that some event is off-screen and can provide a seamless interface. Another feature relates to navigating the days shown in a week view of a calendar. For example, when gesturing to move the calendar forward or backward by a week, the calendar can be made to stop at the current day (or other selected day) as well as the start of the week. As today can have particular importance for previewing the coming days, such navigation allows a user to more quickly and easily view important events in the calendar.

I. Introduction

Figure 1A:
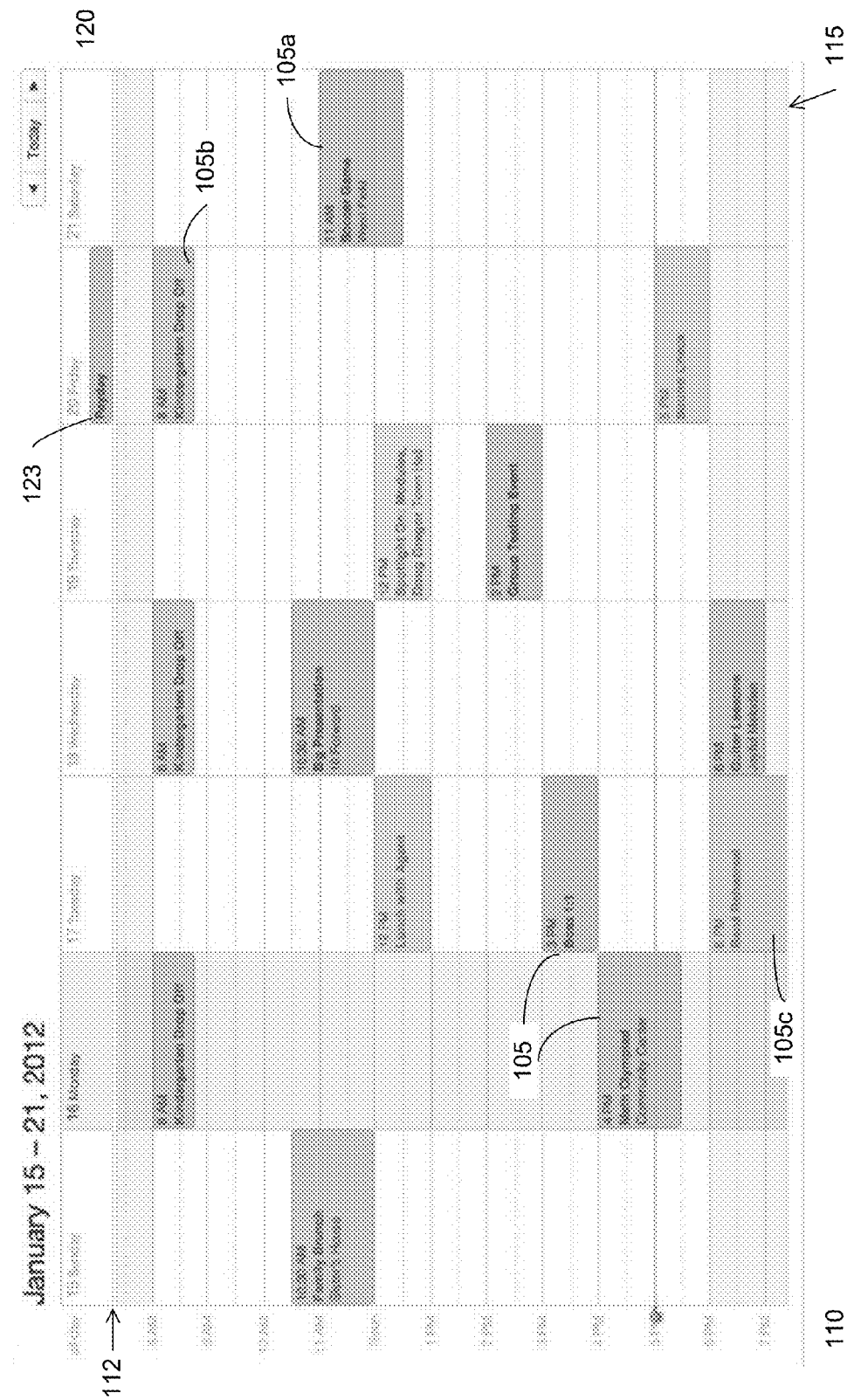
FIG. 1A shows a calendar window of a calendar application that may be improved with embodiments of the present invention.

FIG. 1A shows a calendar window 100 of a calendar application that may be improved with embodiments of the present invention. The calendar application may be running on one or more processors of a computer system and shown on a display (e.g. a compute monitor or internal imaging device) of the computer system. As shown, calendar window 100 has columns 120 showing a week starting on Sunday and going to Saturday. A week may be any seven days, and may start on any day (e.g. Saturday instead of Sunday). The rows 110 show times within a selected time range, which may be displayed in various formats, such as military or standard time.

Event objects 105 are shown in the calendar window. Event objects 105 correspond to events that have put entered into the calendar application. An event can be defined with a start time and an end time on a particular day. A user can enter in such information in carious ways, e.g., by entering in the times with a keyboard, selecting a time with a cursor by clicking on calendar window 100 at a particular time, or by speaking commands regarding the event and the times. A user can also define a narrative for the event.

An event object can then be displayed to in calendar window 100 to show the start and end time of the particular event on the particular day. For example, event object 105a has been defined to be between 11 AM and 12:30 PM on Saturday, Jan. 21, 2012. Event object 105a shows 11 AM as the starting time in text (although other embodiments can rely on rows 110 to indicate time), along with a narrative explaining a title of the event "Soccer game" and an explanation of where the event is at "West Field".

Events can also be specified with just one time entered by a user. For example, a user can specify a start time, and a default length of time can be used to determine the end time. Similarly, a user could identify an end time, with the start time being define using a default. Thus, although each event does have a start and end time, a user does not have to specify both values. In various embodiments, the default length could be 30 minutes, an hour, or for the rest of the day, which may be up until a certain time (e.g., the end of the work day or to midnight). Additionally, a user can specify that an event is all day, which effectively specifies the start time and an end to be predetermined values, such as 8 am to 5 PM. Instead of a default value, the user can also specify a time length.

An events can also be defined to occur on more than one day. For example, an event can repeat on certain days of the week or on consecutive days. Event object 105b which starts at 8 am and end at about 8:45 AM on Friday, Jan. 20, 2012 corresponds to an event that also occurs on Monday and Wednesday at the same times. Thus, a user may indicate multiple events through a single interface. For example, a user can specify that the kindergarten pickup is to repeat on Monday, Wednesday, and Friday of every week.

A beginning 112 of the time range marks the time at which event objects occurring later are displayed at the time the corresponding event occurs. Event objects that occur before beginning 112 are not displayed. An ending 115 of the time range marks the time at which event objects occurring before are displayed at the time the corresponding event occurs. Event objects that occur after ending 115 are not displayed. As shown, the time range is about 7:30 AM to about 7:30 PM. Beginning 112 and ending 115 are examples of edges of calendar window 100. It is possible that the calendar is displayed with time on the horizontal axis, and thus the edges of the time range may appear on the left and the right of calendar window 100 instead of at the top and the bottom.

Some event objects may be partially displayed in the time range. For example, event object 105c starts at 6 PM and runs until 8 PM. But, 8 PM is after ending 115 of the time range. In this case, event object 105c is displayed in the times that are visible for the current settings of the time range.

An all-day event can also be defined. Such an event is typically associated with an event that occurs that day, but not at any specific time, or the time is not of importance and is not specified. As shown, payday object 123 is such an all-day event. Payday object 123 is shown at the top of the Friday column, and does not appear in the displayed time range.

Figure 1B:
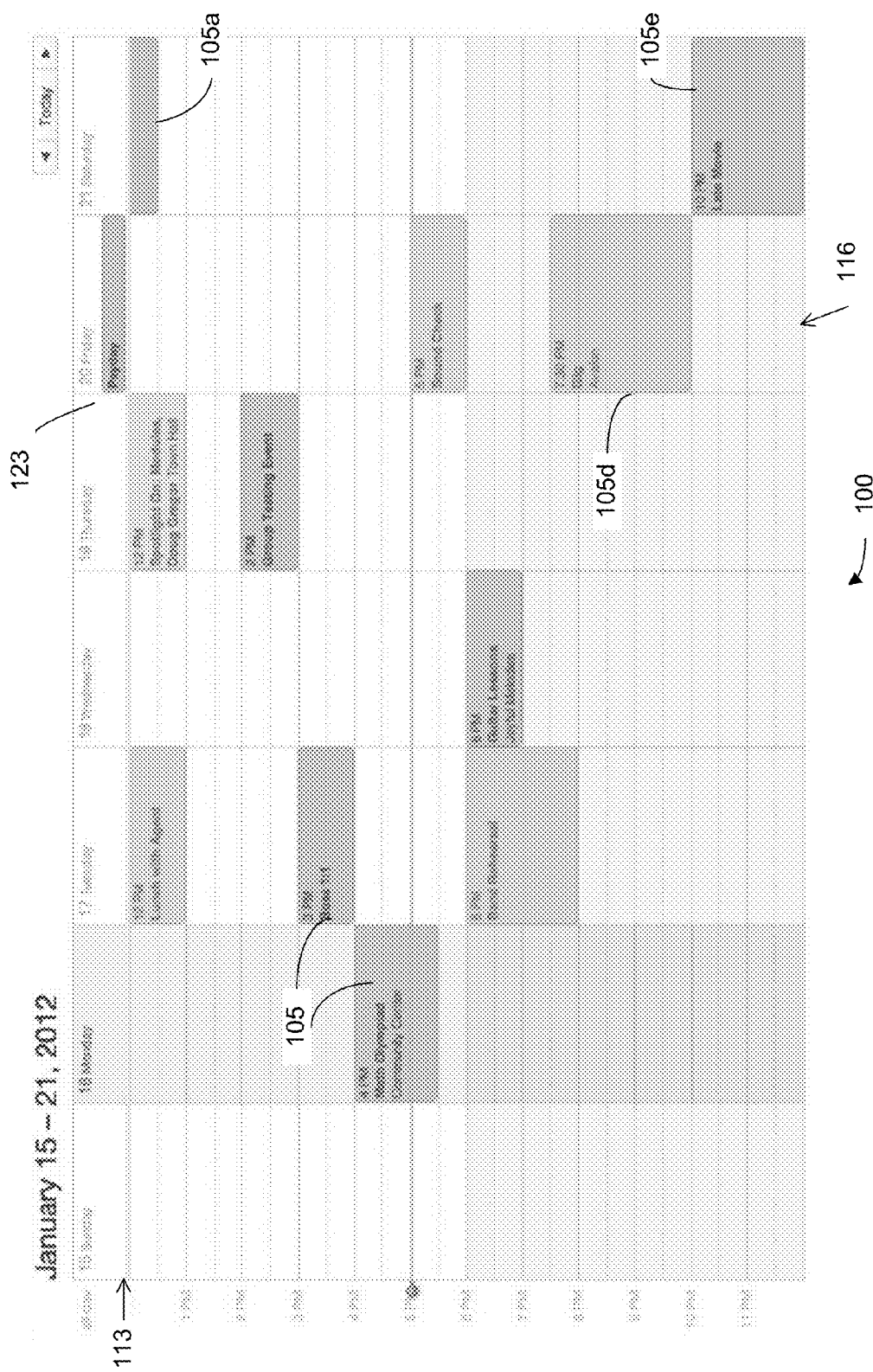
FIG. 1B shows calendar window with a different time range.

FIG. 1B shows calendar window 100 with a different time range. In FIG. 1B, the time range is from about 12 noon to about 12 AM. Events objects 105 and 105a are still labeled as in FIG. 1A. However, event object 105b is no longer visible in the new time range. Event object 105b has an end time at 8:45 AM, which is before the beginning 113, which is 12 noon. Thus, if one is viewing the calendar with the time range corresponding to beginning 113 and ending 116, a user does not know the existence of event object 105b.

Additionally, FIG. 1B shows two new event objects 105d and 105e. Event object 105d has a start time of 7:30 PM, which is at the ending time 115, and thus was not displayed for the time range selected in FIG. 1A. But, 7:30 PM is before ending time 116, and thus event object 105d is displayed in the selected time range of FIG. 1B. Similarly, event object 105e has a start time of 10:00 PM, which is after the ending time 115, and thus was not displayed for the time range selected in FIG. 1A. But, 10:00 PM is before ending time 116, and thus event object 105e is displayed in the selected time range of FIG. 1B.

II. User Interface for Off-Screen Events

Figure 2A:
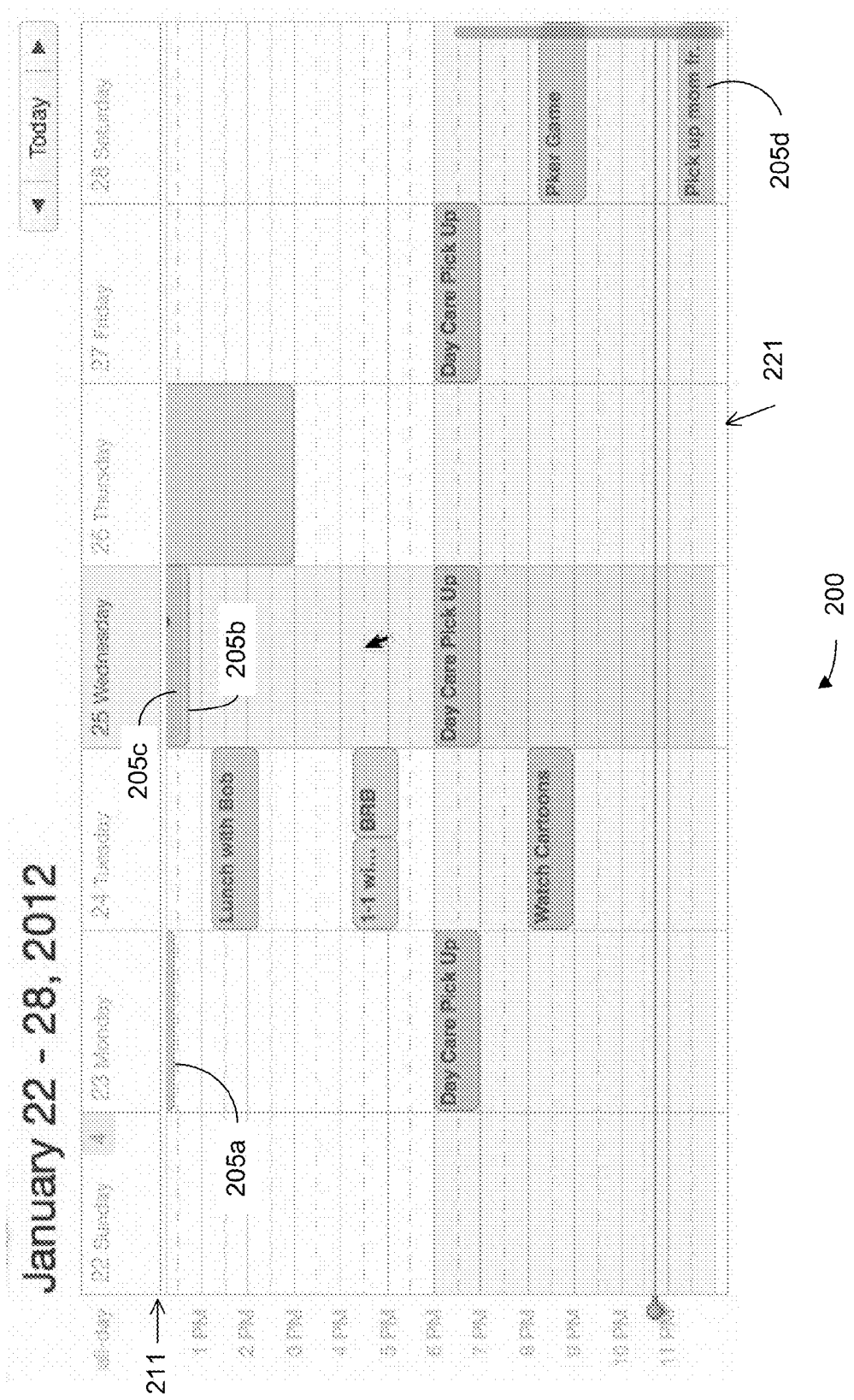
FIG. 2A shows a graphical user interface (GUI) for viewing a calendar application according to embodiments of the present invention.

FIG. 2A shows a graphical user interface (GUI) for viewing a calendar application according to embodiments of the present invention. The calendar application may be running on one or more processors of a computer system and shown on a display (e.g. a compute monitor, projector, or internal imaging device) of the computer system, as can other embodiments of calendar applications described herein. Calendar window 200 is laid out in a similar fashion as calendar window 100. However, event objects that are off-screen are now identified.

Calendar window 200 is shown with a viewable time range of about 12:15 PM to about midnight. In some embodiments, events can span more than one day and an event object can extend past midnight. Event object 205a is shown displayed at beginning time 211 (about 12:15 in this case). As shown, event object 205a indicates that an event occurs before beginning time 211. Since a small part of event object 205a is displayed one can identify that the event object does not simply end right after beginning time 211. In one implementation, only four pixels in height are shown for a clipped event object, but other implementations could use more or less. Other embodiments described below can provide greater clarity in distinguishing event objects that end just after a beginning edge of the time range, and instances where an off-screen event is being indicated. Event object 205a could be shown above beginning edge 211, but such an embodiment could have confusion with all-day events.

If there are more than two events that end (i.e. have an end time) before the beginning edge of the selected time range, parts of two event objects can be shown. For example, event object 205b and event object 205c are shown for Wednesday. Since there are two event objects, the objects are stacked on top of each other. As shown, event object 205b extends lower than event object 205c. Thus, one can easily identify the number of events that are off-screen. In another embodiment, one event object (e.g., the most recent event object getting held at the edge) is displayed along with a number indicating the number of events that are off-screen.

Because both objects are stacked, the two objects may appear as one object. To remedy this, some embodiments can shift to the right the event object that is later in time while having that event object extend lower. For example, event object 205b can be shift to the right (an example of a transverse direction). If the stacked events are of a different calendar, the distinctions can be easier to see, as is shown in other figures. To provide greater clarity, event objects occurring earlier could be displayed in a top layer, and thus they can be seen, which is shown in later figures.

Attention is brought to event object 205d, as it is still viewable within the selected time range, but will soon not be once a range control is used to move the time range up. The time range may be changed in various ways, using a range control. For instance, when a cursor (e.g., as controlled via a pointing device like a mouse) hovers over the calendar window, a scroll wheel can be used to move the time range up and down. Other examples include: specifying the time range via text or picklist (i.e. specifying a beginning time and an ending time), dragging a scroll bar, and swiping on a surface of the display. These features and others mentioned above may be implemented within embodiments of the present invention.

Figure 2B:
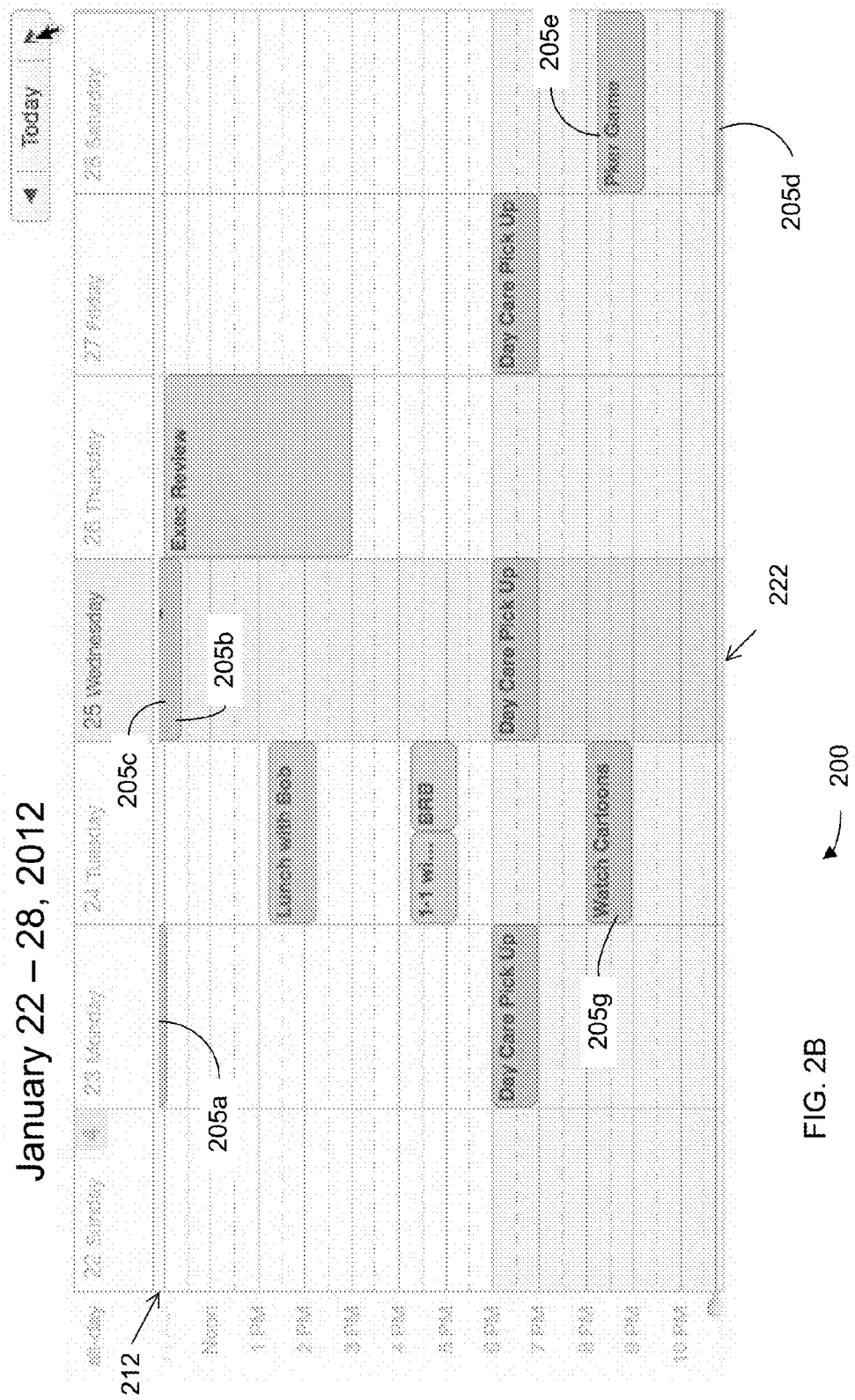
FIGS. 2B-2D show graphical user interfaces (GUI) with progressively earlier time ranges for the calendar window.

FIG. 2B shows a graphical user interface (GUI) with an earlier time range for calendar window 200. The time range shown is between about 11 AM and 11 PM, which is between beginning 212 and ending 222. As one can see, event object 205d is now shown at ending edge 222 to indicate that an event starts later than the ending of the time range, i.e. about 11 PM. As shown in FIG. 2A, the event object 205d actually starts at about 11:15 PM. Note that other time ranges besides about 12 hours may be used.

In one embodiment, where the time range is changed continuously (e.g. by scrolling) to later times (e.g., from FIG. 2B to FIG. 2A), event object 205d moves down calendar window 200. As the top (e.g., as signified by the start time) of event object 205d reaches the ending edge, event object 205d can stick at the ending edge, thereby preserving the notification of an off-screen object. As discussed later, when other event objects on the same day move downward, the top of each event object can be held at a point slightly above the highest event object already stuck at the ending edge.

Event object 205e indicates that the poker game starts at about 8:15 PM. If the time range ends at a time earlier than 8:15 PM, then two events would be off-screen, in this case, starting later than the end of the selected time range. Some embodiments can indicate when two events are off-screen, as shown in FIG. 2C.

Figure 2C:
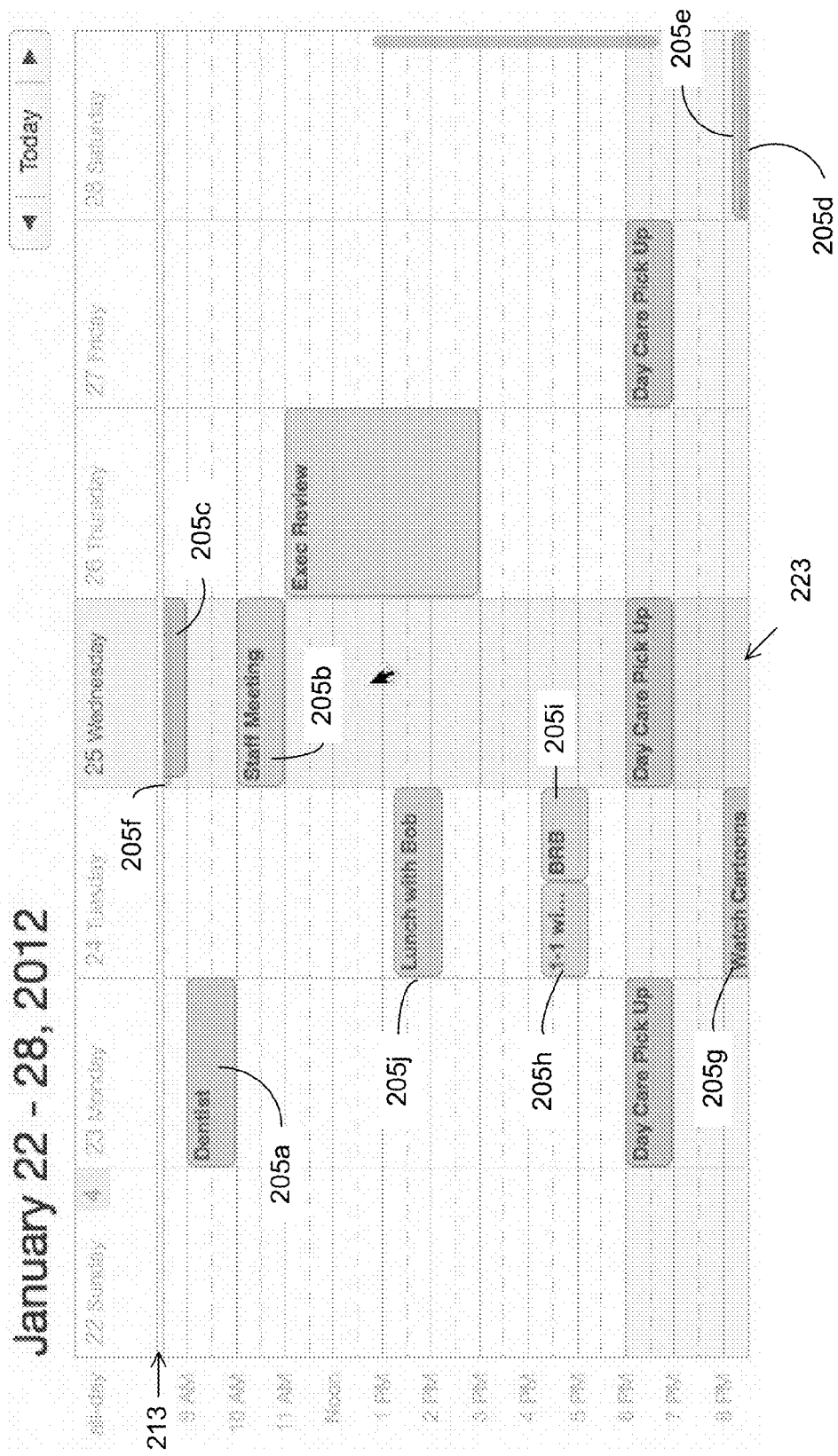

FIG. 2C shows a graphical user interface (GUI) with an earlier time range for calendar window 200. The time range shown is between about 8:30 AM and 8:30 PM, which corresponds to beginning 213 and ending 223. As is shown, both events object 205d and event objet 205e are displayed at the ending edge 223 of calendar window 200. Specifically, object 205e is shown stacked on top of event object 205d, which is shown in the forefront so it can be seen. Accordingly, the fact that two events occur later than 8:30 PM on Saturday the 28$^{th}$ can be identified by a user, even when the two event objects are from a same calendar (e.g. a blue calendar for personal events).

Event object 205b is now fully within the selected time range of about 8:30 AM to 8:30 PM. Event object 205b is shown displayed between 10 AM and 11 AM. Thus, the previous time ranges would have informed a user that an event occurred before 11 AM on Wednesday. Also, a user can be specifically informed that an event on the green calendar (e.g., a work calendar) had an ending time that is closest to the time ranges with beginnings 211 and 212. Likewise, a user can be informed that event object 205c with the next closest end time was on a pink calendar (e.g. a calendar related to a child), with event objet 205c being displayed on top of 205b (but not extending downward as far) in FIGS. 2A and 2B.

As for event object 205c, it no longer is displayed just at beginning edge 213, but now event object 205c is shown to have an end time of 9 AM. Additionally, event object 205f is shown at beginning edge 213 to signify that an event ends before 8:30 AM, and is this off-screen. In some embodiments, in order to more clearly see overlapping event objects, one or more event objects can be shifted (e.g., to the right or the left). As shown, event object 205c has a left edge shifted to the right, so that a user can see event object 205f. As mentioned above, such a shift can be performed when multiple event objects are displayed at an edge. In some embodiments, the number of event objects that are stacked can be limited to a predetermined number, such as two or three. For example, if a new event object reaches the edge, the event object on the bottom (or top for the beginning edge) can be removed when the new event object is added. As an alternative, the most recent event object reaching the edge might simply disappear and not be added to the stack.

Figure 2D:
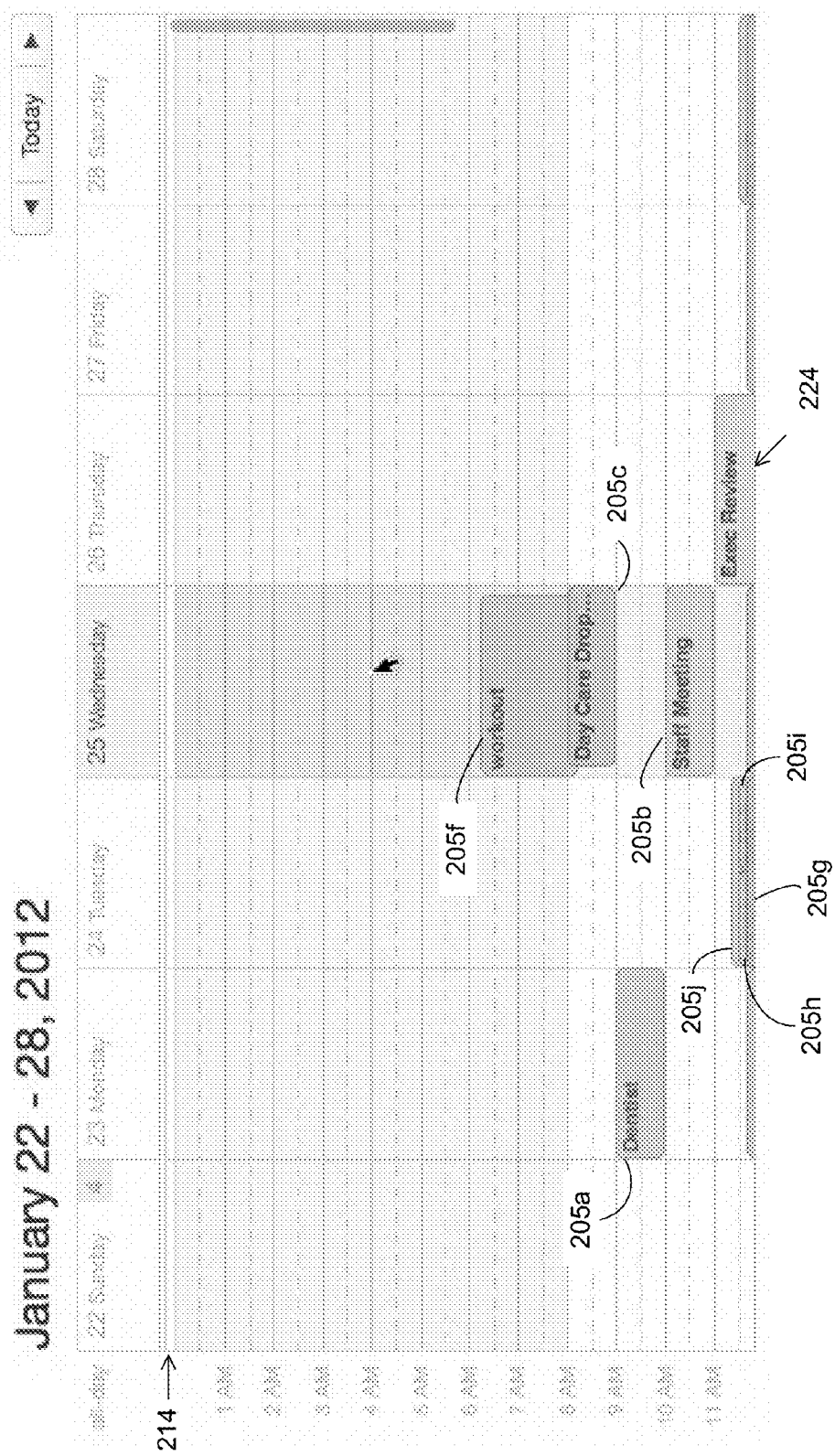

Event objects 205g-205j are also pointed out as these objects will become stacked in FIG. 2D. Event objects can also be shifted when two events occur at the same time. Event objects 205h and 205i are shown in a split view, where each occupies half of the column for Tuesday.

FIG. 2D shows a graphical user interface (GUI) with an earlier time range for calendar window 200. The time range shown is between about 12:00 AM and 12:00 PM, which corresponds to beginning 213 and ending 223. Event objects 205a, 205b, and 205f are now shown with start and end times viewable. However, event objects 205h-205j are now shown stacked on top of each other. The particular stacking shows that event object 205j is from the blue calendar and has a starting time that is before the starting times of the other events in the stack. Event objects 205h and 205i still show the split view to indicate that the corresponding events occur at the same time. Event objects 205h and 205i are also displayed in a foreground of 205j, but do not extend as high as 205j, thereby enabling a user to view all three event objects. And, event object 205g is shown at the bottom of the stack to indicate that event object on the pink calendar has a starting time that is the latest out of the four event objects in the stack. Note that embodiments are still instructive even when only one color is used, or when stacked events are form a same color-coded calendar. In one implementation, only four pixels in height are shown for a clipped event object (e.g. four pixels above or below the next event object in the stack), but other implementations could use more or less.

III. Method for Off-Screen Events

Figure 3:
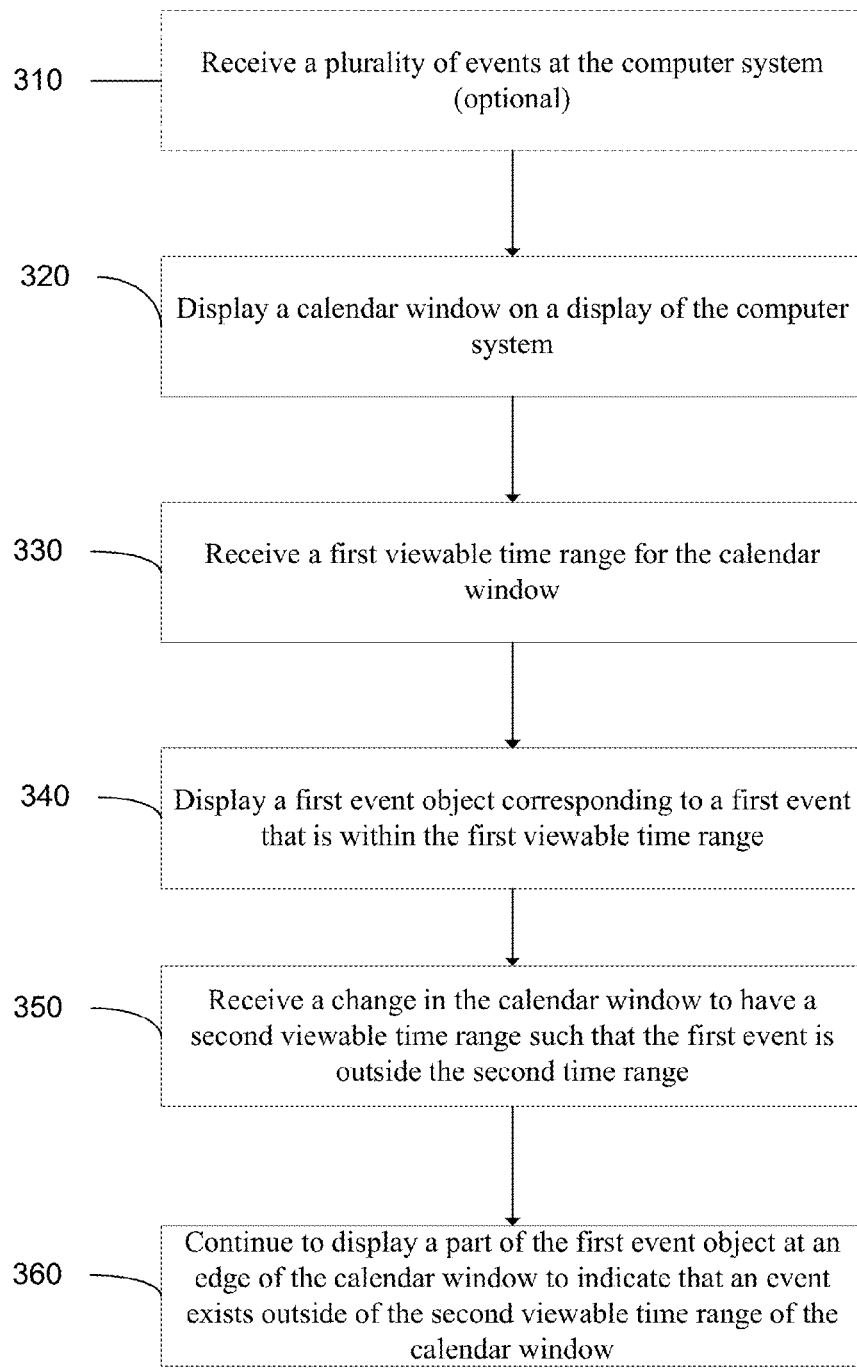
FIG. 3 is a flowchart illustrating a method a method for displaying events in a calendar application executing on a computer system.

FIG. 3 is a flowchart illustrating a method 300 a method for displaying events in a calendar application executing on a computer system. The computer system may include one or more processors and a display, e.g., an LCD display or a projector. The events can be displayed on a calendar window of the application, which can be accomplished by sending graphics information to a graphics processor, which in turn sends signals to a display device.

In step 310, a plurality of events are optionally received at the computer system. For example, a user can specify start times and end times for an event, e.g., as described above. Alternatively, a user can specify events on one device that is networked to a different device (each potentially part of a computer system that includes networked devices), and then send the events form one device to another. Any event information can already be in the application, and thus does not need to be received. In one aspect, each event includes a start time and an end time for one or more days. As mentioned above, an event can repeat for multiple days in a week and/or across weeks.

In step 320, a calendar window is displayed on a display of the computer system. The display can be any means for displaying a computer-generated image. The calendar window has a time range that is user-selectable, e.g., as shown in FIGS. 2A-2D. Various embodiments can allow the user to select the time range in various ways, e.g., via scrolling or entering the desired values for the range. Thus, a user can change the time range in order to view events at various times. In one implementation, the length of the time range is fixed, and a user can shift the time range to cover different periods of a day. In another implementation, the length of the time range is also variable. The displaying can be accomplished by the calendar application by generating graphics information for the calendar window and sending the graphics information to a graphics processor.

In step 330, a first time range for the calendar window is received. The time range can be specified in various ways. The first time range can be specified by the calendar application, e.g., as a default value or from a stored value of the time range last viewed when the calendar application was closed. The user can also specify the time range, e.g., as described herein.

In step 340, a first event object corresponding to a first event that is within the first time range is displayed. The first event object can indicate a first start time and a first end time of the first event. For example, event object 205a in FIG. 2D indicates a start time of 9 AM and an end time of 10 AM. Both of the first start time and the first end time may be within a selected time range, e.g., as is shown for event object 205a in FIG. 2D. Or, just one of the first start time or the second end time may be within the first time range. For example, event object 205g in FIG. 2C has a start time within the selected time range, but the end time is not within the selected time range. As another example, event object 205c in FIG. 2C has an end time within the selected time range, but the start time is not within the selected time range.

In step 350, the calendar window is changed to have a second time range. The second time range has a different beginning and/or ending value compared to the first time range. For some values of change the first event is outside the second time range. For example, the first start time and the first end time of the first event are not within the new values specified for the second time range. The change from the first time range to the second time range can be continuous. For example, the time range may go through multiple intermediate time ranges before reaching the second time range. In various embodiments, the intermediate time ranges can have any value between the two time ranges can be obtained, or the intermediate time ranges can move in specified time increments, such as 5, 10, 15, or 30 minute increments. The change in time ranges can also be a single time change, e.g., a user can enter the times for the time range and the display can immediately jump to the specified time range.

In one embodiment, the calendar application checks where the ending edge of the time range is at compared to the start time of events and determines if the event object is to be held at the ending edge. Similarly, the calendar application can check where the beginning edge of the time range is at compared to the end time of events and determines if the event object is to be held at the ending edge. However, tracking every event object could be computationally demanding. Thus, one implementation can identify event objects that are within a threshold of the edges, and the calendar application can track locations of these event objects in relation to the edges while the time range is scrolling.

In step 360, a part of the first event object is displayed at an edge of the calendar window to indicate that an event exists outside of the second time range of the calendar window. Normally, if an event is not within a specified range, a corresponding event object would not be displayed. However, embodiments continue to display the first event object, thereby providing additional information to the user, e.g., that an event exists outside the selected time range, a number of off-screen events in a particular direction (i.e. earlier or later than the selected time range), and which type of calendar the off-screen event is from (e.g. work or personal calendar).

In embodiments where the change is continuous, the beginning and ending of the time range of the calendar window can change in a continuous manner. The start and end times of an event object can be tracked. For example, the ending of the time range reaching the first start time can be identified. Then, a beginning part of the first event object (e.g., a top of the object) can be held at the ending of the time range as the time range continues to change, as opposed to the first event object completely disappearing. As another example, when the beginning of the time range reaches the first end time can also be identified. Then, an ending part of the first event object can be held at the beginning of the time range as the time range continues to change. Thus, the event object can stick within the viewable area of the calendar window even after the event itself moves outside of the current time range. Such a technique can provide a seamless movement of objects on the screen, so as not to distract a user, and information about an event object can be retained once the event moves off-screen.

In one embodiment, the first start time or the first end time can be displayed as time values at the edge of the calendar window along with the part of the first event object. In this manner, a user can identify more information about the event not included in the selected time range. Thus, a user could know when an event start, as opposed to just knowing that an event occurs later than the selected time range.

To indicate that more than one event occurs before or after the selected time range, the event objects may be stacked at a respective edge of the calendar window. For example, a second event object corresponds to a second event, where the second event includes a same day as the first event. For instance, both events occur on a particular Wednesday. A part of the second event object can continue to be displayed at the edge of the calendar window when the second event falls outside of the time range of the calendar window at the edge. If the first event is after the second event, but both are outside of the selected time range, the second event could be displayed on top of the first event.

The stack can be created by displaying the first event object in a foreground and the second event object behind it, with the first event object being of smaller size than the second event object. In another embodiment, the part of the second event object that is displayed has a bottom part that ends when the top part of the first event object begins, when stacked at the edge. In such an embodiment, both event objects can be displayed in the same layer. Both scenarios can generate a stack of event objects. To help see the different event objects of a stack, the first event object and/or the second event object can be shifted when one of the first event object and the second event object is displayed stacked on top of the other. For example, if a left edge of an event object displayed in the foreground is shifted to the right, an event object in the background can more easily be seen.

The number of event objects shown at an edge can be limited by a predetermined number. When a number of events objects that are displayed at the edge of the calendar window exceeds a predetermined number, one of the event objects can be dropped, and not displayed any more. For example, if the predetermined number was three, suppose another event object becomes held at an edge where a stack of three event objects is already held. Then, one of the event objects is dropped, e.g., the event object furthest from the edge, which can be the event with the earliest ending event for the beginning edge of the time range and the latest starting event for the ending edge of the time range. In one embodiment, if two events in the stack are from a same calendar (e.g. a personal calendar), then one of those can be dropped in favor of an event from a different calendar.

In one embodiment, the viewable part of an event object can be tracked. For example, the event object can be displayed between a first boundary and a second boundary. When the corresponding event is entirely within the selected time range, then the first boundary would correspond to the start time of the event and the second boundary would correspond to the end time. In FIG. 2B, event object 205g has the boundaries corresponding to the start and end times of the corresponding event, since the event is within the selected time range of beginning edge 212 and ending edge 222.

As the selected time range changes to edges 213 and 223 in FIG. 2C, the second boundary deviates from the end time of the corresponding event. Specifically, when the second boundary reaches ending edge 223, the second boundary is held at the ending edge as that edge changes. Accordingly, as ending edge continues to become earlier in time, the second boundary of event object 205g corresponds to the ending edge. The viewable part of the event object is thus visually compressed. Similarly, the first boundary can be held at the beginning edge if the time range is moved in the other direction. The first boundary would then be the initial boundary reaching an edge of the selected time range.

The visual compression is stopped before the viewable part of the event object disappears. For example, when a size of the event object reaches a first predetermined value, the visual compression of the first event object is stopped. As shown in FIG. 2D, when the height of the displayed part of event object 205g reaches a certain value (e.g., four pixels in height), the first boundary is held at a value that is four pixels above the second boundary. Thus, the compressed event object continues to be displayed even when both the start and end time of the corresponding event are outside of the selected time range.

For stacking, the following event objects can have a different predetermined size. For instance, event object 205i can have a height that is double the height of event object 205g. But, since event object 205g is in a top layer, only part of event object 205g is actually displayed. In this manner, the viewable part of both event objects is about the same. Other embodiments could have the viewable parts differ. A similar technique can be used for stacking at the beginning boundary.

In another embodiment for stacking, the initial (leading) boundary of the following event object (e.g. event object 205i) could be held at the first boundary of the first event object (e.g., event object 205g), instead of being held at the ending edge 224. In this manner, different layers are not needed. However, such a technique can have display issues when the viewable parts have curves, which would cause some horizontal pixels to have different boundaries, as is shown. Such problems could be cured by having the boundaries being defined for each horizontal pixel so that the leading boundary is held at the boundary value define for that horizontal pixel.

The concept of showing indicators of off-screen events can also be used to show interday information. For example, if a user is trying to schedule a meeting and is only viewing one day (e.g. as the viewing is on a handheld device), then the calendar window can indicate if an event on a previous or next day has an event at a particular block of time, e.g., by hour. Or, as an alternative, an indication of no event can be provided. Such indicators could simply be arrows or other objects, which are separate from the event objects.

IV. Alternative User Interfaces for Off-Screen Events

For some people, it may be difficult to identify whether an event object displayed at the edge of the calendar window is indicating an off-screen event or whether the start time (or end time) is just very close to the edge of the time range. Accordingly, some embodiments can modify the event object to indicate the difference. For example, the width of the event object could be reduced once the event falls outside of a time range. In one implementation, the computer system can track when a start time of an event objects reaches the ending edge of the time range, and modify the event object at that time. As another example, the event objet can be rotated.

Figure 4:
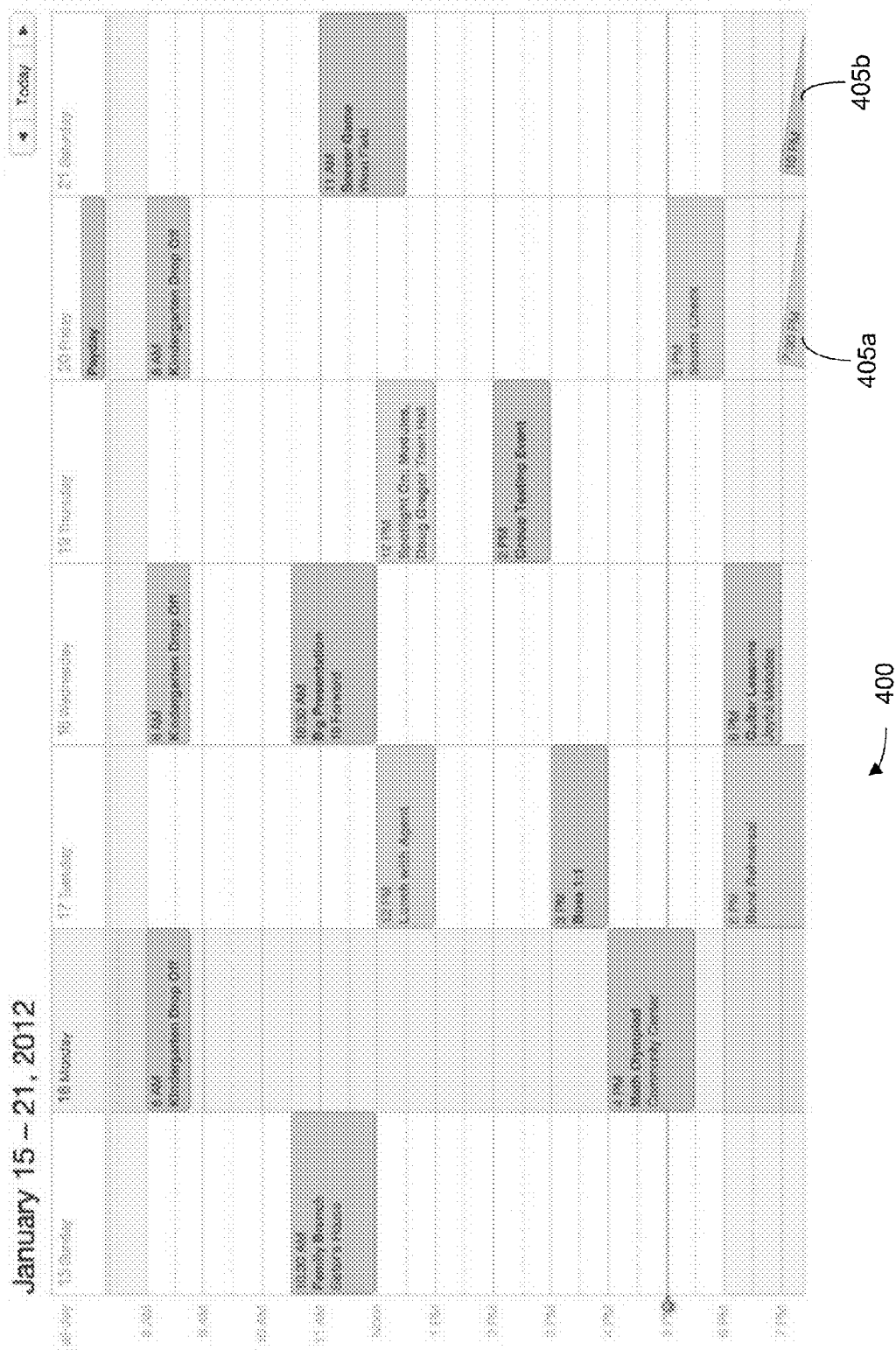
FIG. 4 shows a graphical user interface (GUI) for viewing a calendar application where an event object is rotated at an edge of the calendar window according to embodiments of the present invention.

FIG. 4 shows a graphical user interface (GUI) for viewing a calendar application where an event object is rotated at an edge of the calendar window 400 according to embodiments of the present invention. Calendar window 400 is similar features as calendar window 200, with a time range on the vertical axis and different days of a week on a horizontal axis. The selected time range runs between just before 7:30 AM to just before 7:30 PM.

As shown, a part of event objects 405a and 405b are displayed at an edge of calendar window 400 to indicate off-screen events. These event objects have start times of 7:30 PM and 10 PM, respectively. To show that event objects 405a and 405b are indicating an off-screen event and not an on-screen (i.e. within the selected time range), event objects 405a and 405b are rotated. As shown, the rotation is clockwise, but counterclockwise rotation can also be used. As an example, event objects for off-screen events at the beginning edge of the time range could be rotated in one direction, and the events objects for off-screen events at the ending edge of the time range could be rotated in the other direction.

As mentioned above, there can be two off-screen events in the same direction for a particular day. In embodiments mentioned above, such event objects may be stacked, e.g., to show a number of off-screen events occurring before the beginning edge or after the ending edge. Such stacking can also be used when the event objects are rotated. The relative times for these event objects indicating off-screen events can also be indicated by the positions in the stack, as described above.

In another embodiment, the rotated events objects could be displayed side-by-side, or at least shifted in some manner with some overlap. Thus, a top corner (or bottom corner when the beginning edge is involved) of each event object at the edge could be at a different location on the horizontal axis. In order to indicate a relative time, the top (for ending edge) or bottom (for beginning edge) of the corners of the event objects could be used, as for embodiments using a stack. In another implementation, a time can be displayed for each modified event object. As shown, a starting time is shown as a time value in the top corner for event objects 405a and 405b. For event objects at the beginning edge, the ending time could be displayed.

Accordingly, various embodiments can provide an indication of an event that is off screen (outside of a selected time range) using a same event object that is used when the event does fall within the selected time range. Such use of the event object provides a seamless display for providing information about the event object, and can indicate which calendar the even belongs to, among other information conveyed by the event object. Further, the display of multiple event objects at an edge of a calendar window can convey that multiple events are off-screen.

V. Navigating Week View

Typical calendar applications have two methods for navigating when viewing a week. One can scroll one week at a time or scroll one day at a time, where each has inherent limitations. Embodiments can combine aspects of scrolling by day and scrolling by week into a hybrid approach that includes advantages of both. In one embodiment, a new navigation mechanism navigates in the week view by keeping today (or other selected day) at the left most column. For example, the week can be displayed with the current day first (e.g. in the left most column), thereby providing a more relevant view to a user. Then, when a user selects to move forward or backward, the next or previous full week (i.e. starting with a designated day, such as Sunday or Monday) can be displayed. And, when a user forward through the current day (or other selected day), the week view can stop with the selected day displayed first, to give a user a view of the next set of days following the selected day.

A. Setup

Figure 5:
FIG. 5 shows a graphical user interface (GUI) for viewing a calendar application where an event object indicating an off-screen event is highlighted the calendar window 500 according to embodiments of the present invention.

FIG. 5 shows a graphical user interface (GUI) 510 for providing setup information for navigating a calendar window 500 according to embodiments of the present invention. In GUI 510, a user can define which days are to be displayed, the functionality of navigation buttons, and how events are displayed. GUI 510 allows settings to be selected, and is an example of a setting interface.

Picklist 520 (also called a dropdown menu) may be used to select how many days are displayed for a week. In some embodiments, the two options are five days (e.g., Monday through Friday of the standard workweek in the Unites States) and seven days of the standard full week. In other embodiments, a week can be defined as including 3, 4, or 6 sequential days, which may be consecutive days or non-consecutive days, e.g., Monday, Wednesday, and Friday are still sequential but no consecutive.

Picklist 530 may be used to determine the start (boundary) day of a week. The boundary day can be used as a default day for displaying first when displaying a week in a calendar window. For example, defining Sunday to be the boundary day can result in Sunday being displayed in a left most column of a week view in a calendar. When less than seven days are chosen to be in a week, the options for a start day be may be reduced to be less than all seven days of the standard week.

Picklist 540 allows a user to define how to navigate in week view. In one embodiment, there are three options: day, week, and auto. The day option moves the calendar by one day at a time (e.g., advances one day or reverses one day). The week option moves the calendar from the boundary day of one week being displayed first (e.g. left most column) to the boundary day of the next week. With the "auto" option, a hybrid navigation scheme can be provide, and other days of the week can be displayed first, as is described below.

Picklist 550 can allow a user to define when a day starts, e.g., a work day. Picklist 560 can allow a user to define when a day ends, e.g., the end of the work day. These values can determine shading in the calendar window and how an event object (as described above) is displayed when the corresponding event is all day. Picklist 570 allows a user to specify how many hours are shown in the calendar window. For example, a user can specify that 12 hours is shown as a fixed time length of a variable time range of the calendar window.

Figure 6:
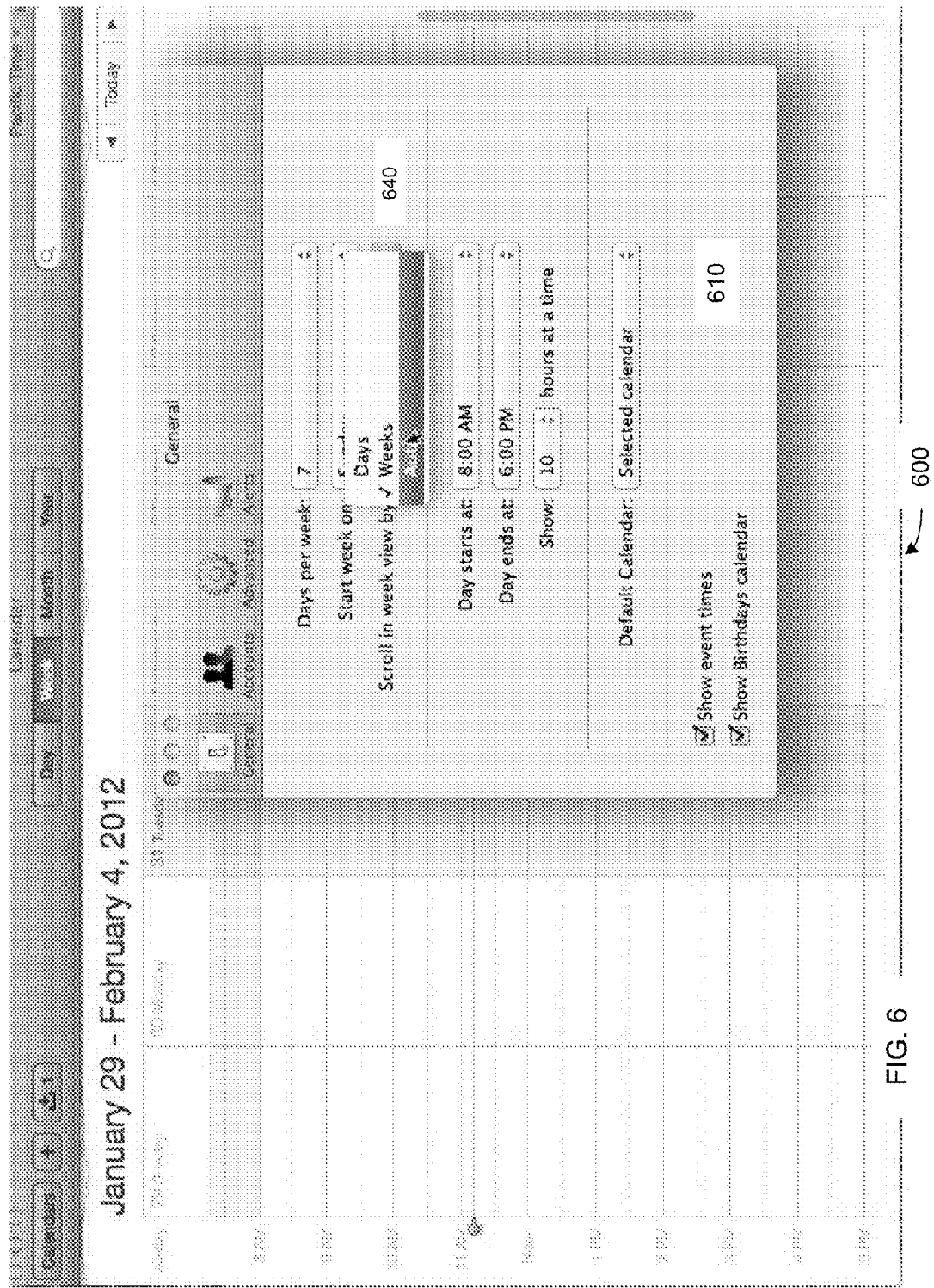
FIG. 6 shows a graphical user interface (GUI) for providing setup information for navigating a calendar window according to embodiments of the present invention.

FIG. 6 shows a graphical user interface (GUI) 610 for selecting options for how to scroll in week view for calendar window 600 according to embodiments of the present invention. Picklist 640 is shown open, and the "auto" option be selected.

B. Basic Operation

Figure 7:
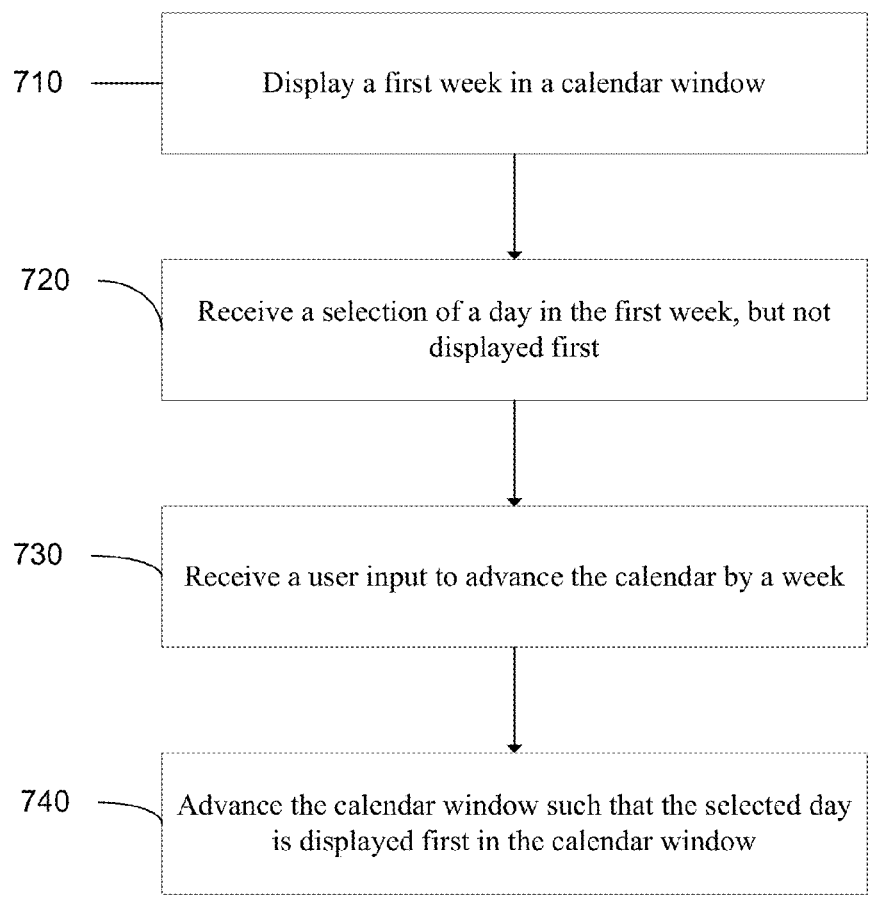
FIG. 7 is a flowchart illustrating a method for navigating a calendar application executing on a computer system according to embodiments of the present invention.

FIG. 7 is a flowchart illustrating a method 700 for navigating a calendar application executing on a computer system according to embodiments of the present invention. Although embodiments are described with respect to a week view, embodiments are applicable to other views of multiple days, such as a month view or any other suitable view of a plurality of days.

Figure 8A:
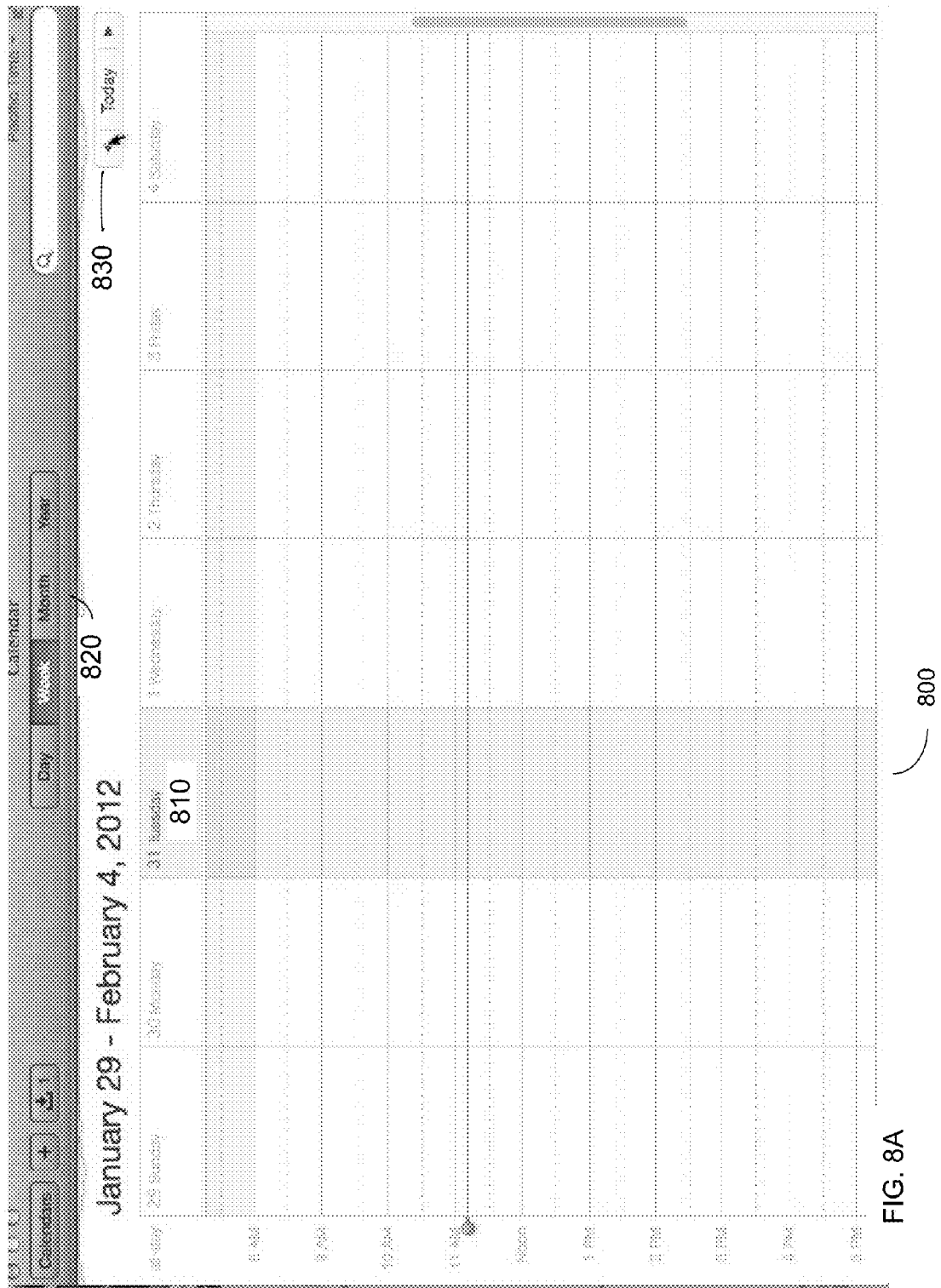
FIG. 8A shows a calendar window of a week view starting with Sunday and a selected day of Tuesday.

In step 710, a first week is displayed in a calendar window. For example, FIG. 8A shows a calendar window 800 of a week view starting with Sunday. Buttons 820 (examples of view objects) may be used to select a day view, week view (shown selected), month view, or year view. The week view is shown.

As shown, the left most column corresponds to the day that is displayed first. The following days then appear in consecutive columns to the right. Other displays are possible, e.g., a right to left display, or an up and down display. The displaying can be accomplished by the calendar application by generating graphics information for the calendar window and sending the graphics information to a graphics processor, as was mentioned above for method 300.

Herein, a week is any set of N sequential days, where N is greater than one. As mentioned above, the displayed seven days can start at any day. For example, the first week could start on a Sunday (as is normal in the Unites Sates), which may be the default for the application. Other default values could have a week starting on Monday or Saturday, as is common in other countries.

In step 720, a selection of a day in the first week is received. The selected day is not displayed first in the calendar window. Thus, if the first displayed day is Sunday, the selected day is not Sunday. In FIG. 8A, the selected day 810 is Tuesday, and is highlighted.

The day may be selected in various ways. For example, the selected day can correspond to today as a default. The calendar application can keep track of the current day (i.e. today), or the calendar application can receive the current day from a module of another application. As another example, a user can specify the selected day. For instance, a user can click on a particular day, enter text into a box to select a day, or any other suitable selection interface may be used.

In step 730, a user input to advance the calendar by a week is received. The user input can be provided in various ways. FIG. 8A shows buttons 830 (examples of navigation objects) for navigating in the week view. The forward button (shown behind the cursor) can be used to advance the days shown in the calendar window. The back button can be used to reverse (rewind) the days shown in the calendar window. In one embodiment, the "today" button is used to display today first, e.g., in the left most column, as is described in more detail later.

In step 740, the calendar window is advanced such that the selected day is displayed first in the calendar window. Thus, although the user has selected to advance the calendar window by a week, the calendar application advances the calendar window only by the number of days to make the selected day appear first in the calendar window.

Figure 8B:
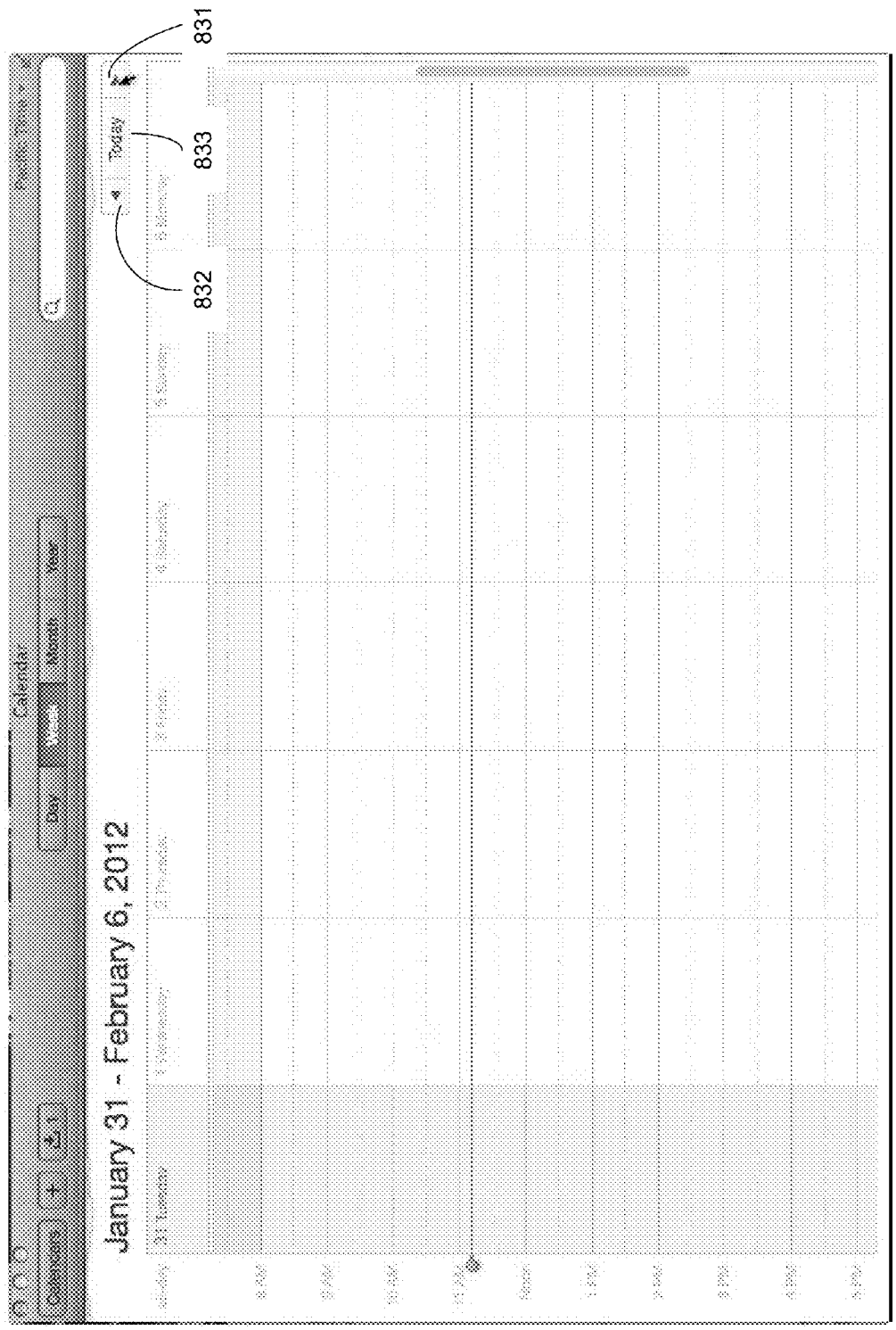
FIG. 8B shows a calendar window of a week view starting with the selected day of Tuesday after being advanced with a navigation object.

FIG. 8B shows a calendar window 850 after the forward button 831 has been selected by a user while the "auto" setting has been selected from picklist 640. In FIG. 8A, Sunday January 29$^{th}$ was shown in the left most column. In other situations as shown below, selecting forward button 831 will cause calendar window to advance seven days. But, since Tuesday January 31 was selected (e.g., because that is the date of today), the calendar window only advances enough days (specifically two) to display Tuesday in the left most column. In this manner, a user will see the events of the next seven days.

C. Advanced Functionality

Besides stopping advancement of the calendar window when the left column hits the selected day (e.g., today), the navigation in week view can differ in other ways from a basic seven day advancement and reversal. For example, when the selected day is displayed first, and the selected day is not the boundary day, then the forward button will cause the next boundary to be displayed at the left column. The selected day (e.g. today) and the boundary are independent of each other, and may be chosen to be the same or different. This feature and others are now described.

Figure 9:
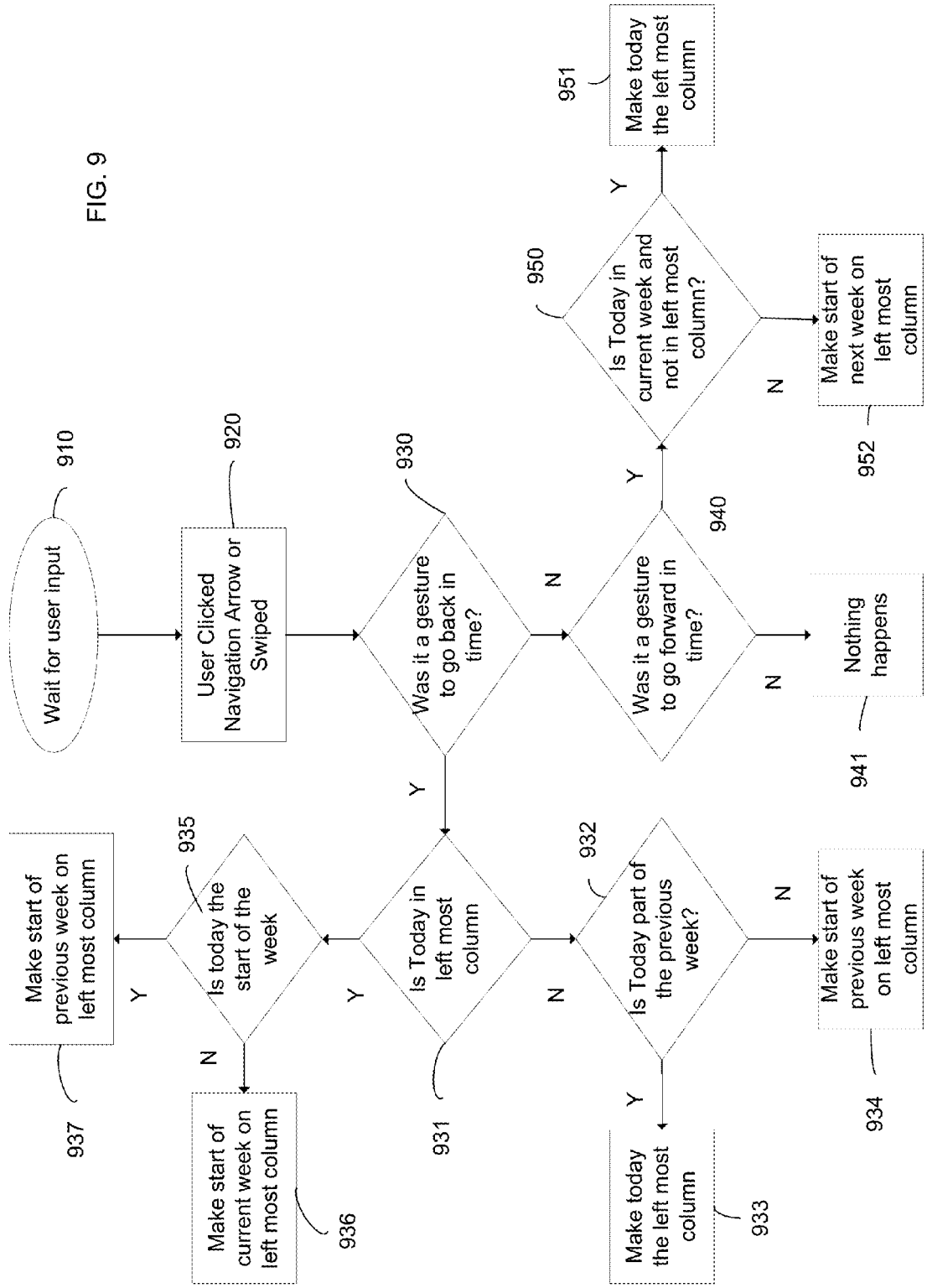
FIG. 9 is a flowchart illustrating a method for determining how to change the days displayed in a calendar window in response to a user input according to embodiments of the present invention.

FIG. 9 is a flowchart illustrating a method 900 for determining how to change the days displayed in a calendar window in response to a user input according to embodiments of the present invention. Method 900 addresses when the user input is to advance or reverse the days displayed in the calendar while in week view. Method 900 refers to "today", but is equally applicable to the selected day being determined in other ways, as described herein. Also, the description assumes that the day being displayed first is in the left most column, but other arrangements of the days (e.g. right to left) can be used.

In step 910, the calendar application executing on a computer system waits for user input. The user input can be provided in any of the ways described herein. In step 920, the user input is received, e.g., a user may have clicked a navigation arrow (back arrow 832 or forward arrow 831) or swiped their fingers across the display in a forward or backward motion.

In step 930, it is determined whether the gesture (i.e. the user input) is to go back in time (i.e. reverse the days). If the gesture was not to go back in time, method 900 proceeds to step 940, which determines whether the gesture was to go forward in time. If the gesture was not forward in time, then nothing happens at step 941. If the gesture was to go forward in time, then method 900 proceeds to step 950.

Figure 10A:
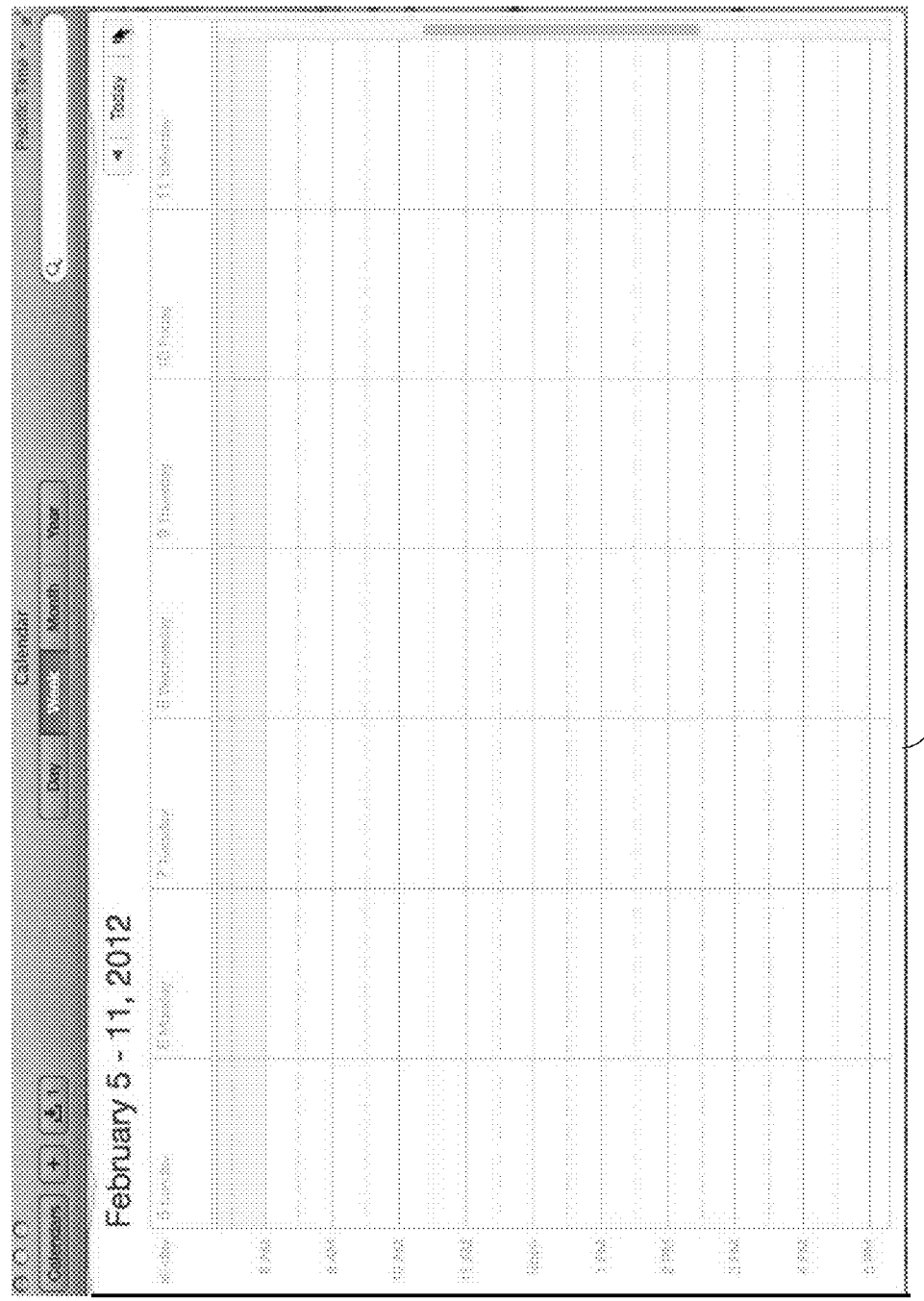
FIG. 10A shows a calendar window resulting from a forward gesture for the calendar window in FIG. 8B.

In step 950, it is determined whether today (or other selected day) is in the currently displayed week and not displayed first (e.g. in the left most column). If today is displayed in the current week but not first, then the calendar window is advanced so that today is displayed first (e.g., in the left most column) at step 951. This example corresponds to the calendar window depicted in FIG. 8A, and the result is depicted in FIG. 8B as calendar window 850. If the criteria of step 950 is not satisfied, then the calendar window is advanced such that the start day (i.e. boundary day) of the next week is displayed first at step 952. FIG. 8B shows calendar window 850 not satisfying the criteria, since today is displayed first. FIG. 10A shows a calendar window 1000 resulting from a forward gesture, as now the next Sunday, February 5, is shown in the left most column. If the user provides another forward gesture, then the calendar window would also change according to step 952, and thus Sunday February 12 would be in the left most column.

Figure 10B:
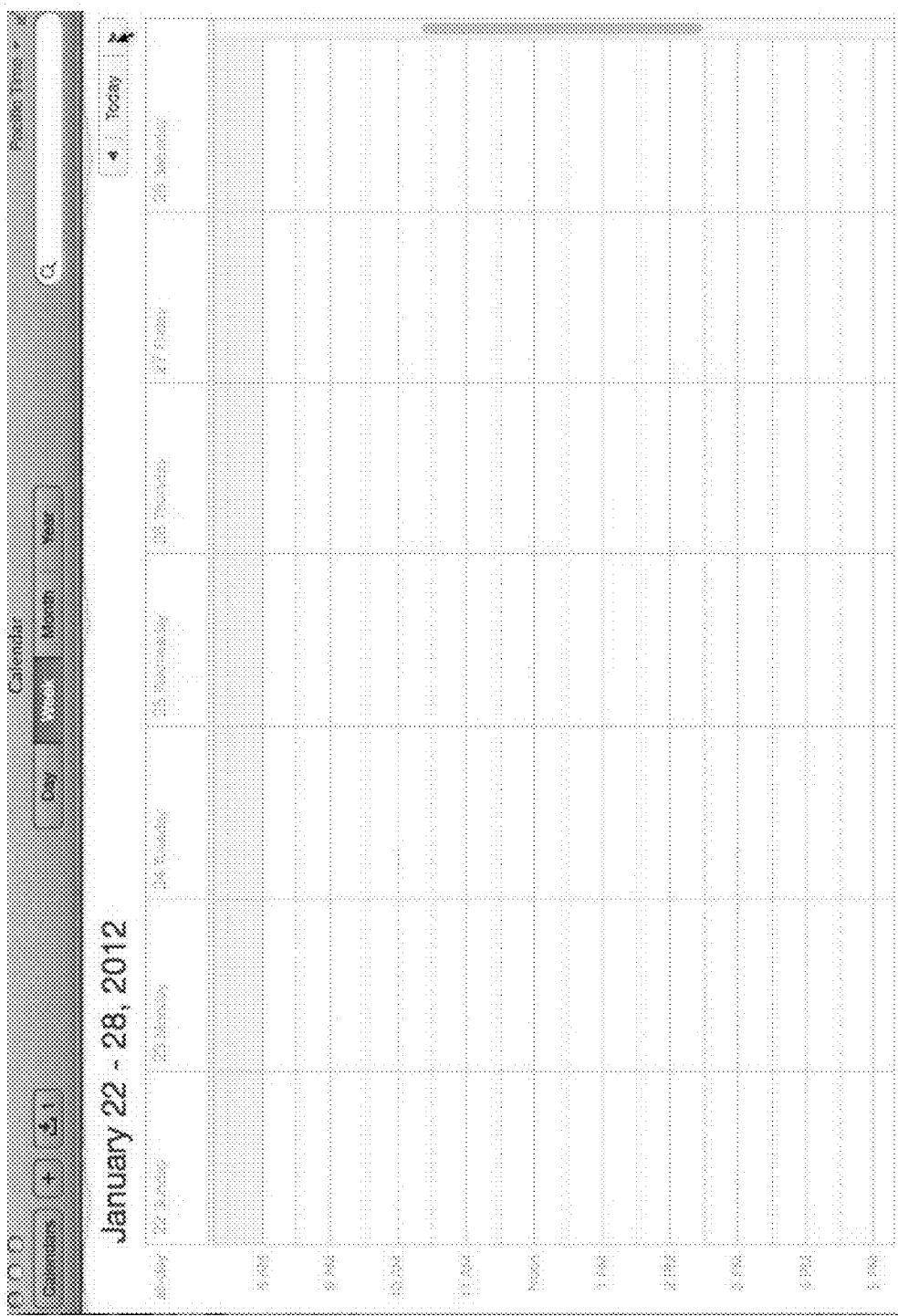
FIG. 10B shows a calendar window resulting from a backward gesture for the calendar window in FIG. 8A.

If the gesture was to go back in time, method 900 proceeds to step 931, where it is determined if today (or other selected day) is currently displayed in the left most column. If today is not displayed in the left most column, then it is determined whether today is part of the previous week. If today is in the previous week, then today is displayed in the left most column at step 933 (which more generally corresponds to the selected day is displayed first). This example corresponds to calendar window 1000 of FIG. 10A, and the resulting calendar window 850 is shown in FIG. 8B. If today is not part of the previous week, then the start of the previous week is displayed first at step 934. For example, if one gestures backward for calendar window 800 in FIG. 8A, then the resulting calendar window is calendar window 1010 of FIG. 10B, since the selected day (Tuesday January 31) is not in the left column and not in the previous week.

If today is in the left most column, then method 900 proceeds to step 935, which determined whether today is the start of the week. If today is the start of the week, then the start of the previous week is displayed at step 937. For example, if today is Sunday (and Sunday was designated as the start of the week), then a back gesture will cause the calendar window to move so that the previous Sunday is in the left most column. If today is not the start of the week, then the start of the current week is displayed in the left most column at step 936. For example, if one gestures backward for calendar window 850 in FIG. 8B, then the resulting calendar window is calendar window 800 of FIG. 10A, since the selected day (Tuesday January 31) is displayed first and is not designated as the start of the week.

Additionally, a navigation object 833 of FIG. 8B can be used to change the calendar window so that Today is displayed first. Thus, wherever a user is at in the calendar, clicking the Today button will move the week view to show Today first followed by the next set of days (e.g. the next six days). For example, if one were at the calendar window in FIG. 10A, selecting navigation object 833 will cause the calendar window in FIG. 8B to be displayed.

In one embodiment, when the computer system launches the Calendar application, it starts with today on the left most column. If a user clicks the next arrow, the calendar advances to the next start of week boundary (ex: Sunday). If a user clicks the next arrow again, it'll scroll by week to the next week boundary. From then on, the navigation is one week at a time. If a user presses the back button, it'll navigate one week at a time, until the calendar enters the current week, where it will stop on Today and keep Today on the left most column. If a user clicks the back button the calendar will go to the start of the current week. From then on, clicking the back button navigates one week at a time. This navigation mechanism is similar to the mechanism of navigating one week at a time, but has the extra advantage of always stopping on Today when you enter the current week.

Additional features can include: if a user leaves the application running overnight, the application can navigate itself one day forward by preserving the current day on the left column. Also, if a user launches the application the next day, the application will automatically start with today on the left most column. Another feature can include: regardless of what days are displayed in the application, clicking on the today button displays today on the left most column.

VI. Computer System

Figure 11:
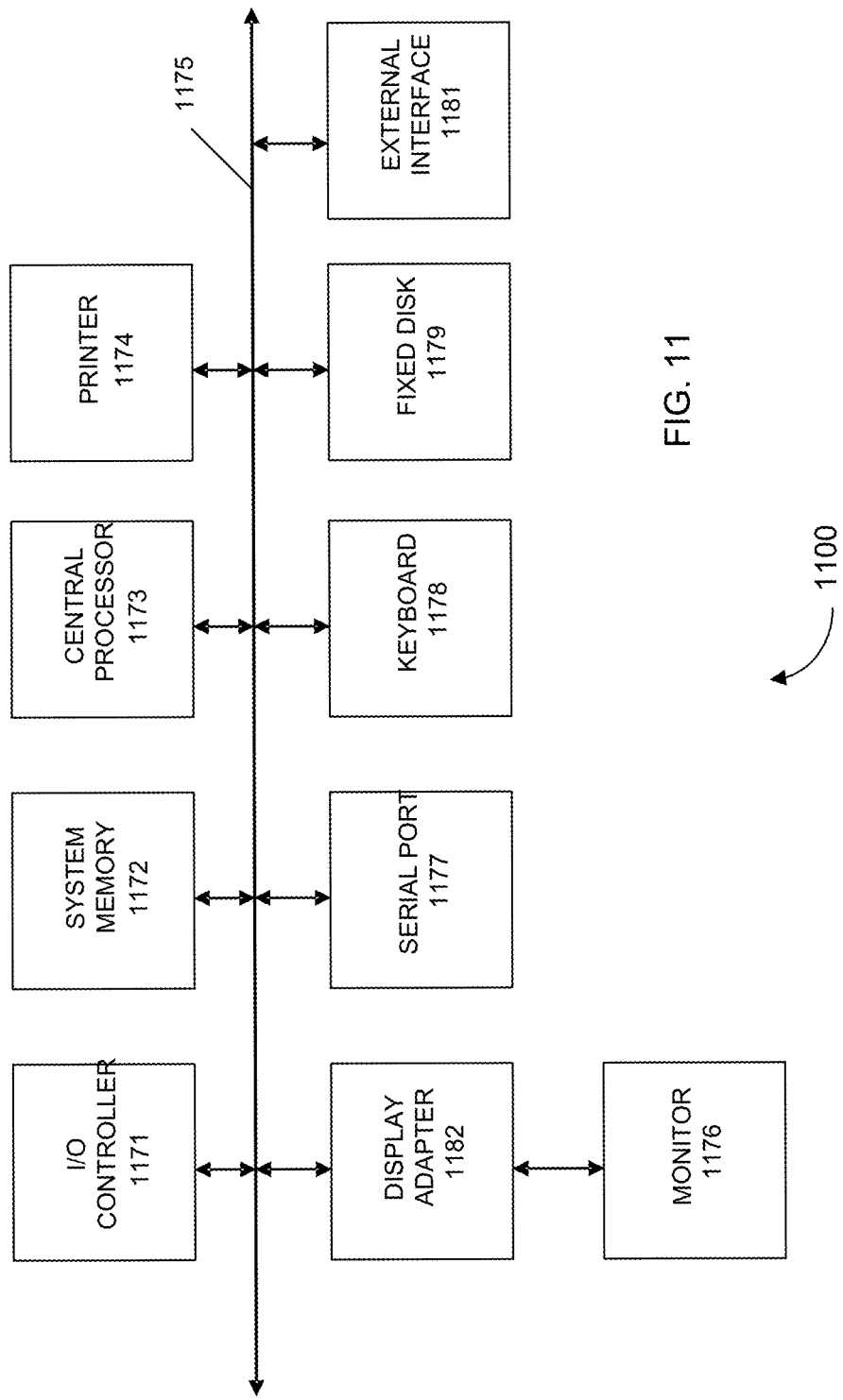
FIG. 11 shows a block diagram of an example computer system 1100 usable with systems, graphical user interfaces, and methods according to embodiments of the present invention.

Any of the computer systems mentioned herein may utilize any suitable number of subsystems. Examples of such subsystems are shown in FIG. 11 in computer apparatus 1100. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 11 are interconnected via a system bus 1175. Additional subsystems such as a printer 1174, keyboard 1178, fixed disk 1179, monitor 1176 (or other display), which is coupled to display adapter 1182, and others are shown. Displaying of the calendar window and other graphical objects can be accomplished by the calendar application executing on the central processor to generate graphics information for the calendar window and send the graphics information to the display adapter (which can include a graphics processor) for rendering an image.

Peripherals and input/output (I/O) devices, which couple to I/O controller 1171, can be connected to the computer system by any number of means known in the art, such as serial port 1177. For example, serial port 1177 or external interface 1181 (e.g. Ethernet, Wi-Fi, etc.) can be used to connect computer system 1100 to a wide area network such as the Internet, a mouse input device, or a scanner. The interconnection via system bus 1175 allows the central processor 1173 to communicate with each subsystem and to control the execution of instructions from system memory 1172 or the fixed disk 1179, as well as the exchange of information between subsystems. The system memory 1172 and/or the fixed disk 1179 may embody a computer readable medium. Any of the values mentioned herein can be output from one component to another component and can be output to the user.

A computer system can include a plurality of the same components or subsystems, e.g., connected together by external interface 1181 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. All patents, patent applications, publications, and descriptions mentioned above are herein incorporated by reference in their entirety for all purposes. None is admitted to be prior art.

What is claimed is:

1. A method of navigating a calendar application executing on a computer system, the method comprising:
    displaying a first week in a week view of a calendar on a display of the computer system, including a first boundary day for the first week, wherein the week view displays three or more sequential days;
    receiving a selection of a particular day in the first week;
    while displaying the first week, receiving an input to advance the week view of the calendar; and,
    in response to receiving the input to advance the week view of the calendar, advancing the week view of the calendar by an amount that is determined based on which day of the week was selected in the received selection of the particular day, wherein the advancing includes:
        in accordance with a determination that the particular day is the first boundary day, displaying a second week in the week view of the calendar, distinct from the first week, wherein the second week comprises a second boundary day that corresponds to a same day-of-the-week as the first boundary day; and
        in accordance with a determination that the particular day is not the first boundary day, displaying a third week in the week view of the calendar, wherein the third week comprises a third boundary day that is the particular day;
    wherein a respective boundary day corresponds to the day-of-the-week displayed first in a sequence of days displayed in the week view in the calendar.

2. The method of claim 1, including:
    while displaying the first week, receiving an input to reverse the week view of the calendar; and
    in response to receiving the input to reverse the week view:
        determining whether the particular day is displayed as the first day in the week view of the first week;
        in accordance with a determination that the particular day is displayed as the first day in the week view of the first week:
            determining whether the particular day corresponds to a predefined first day-of-the-week;
            in accordance with a determination that the particular day corresponds to the predefined first day-of-the-week, displaying a fourth week in the week view, wherein the fourth week is one week earlier than the first week and starts on the same day-of-the-week as the particular day;
            in accordance with a determination that the particular day does not correspond to the predefined first day-of-the-week, displaying a fifth week in the week view, wherein the fifth week starts on the predefined first day-of-the-week preceding the particular day.

3. The method of claim 2, including:
    in response to receiving the input to reverse the week view, in accordance with a determination that the particular day is not displayed as the first day in the week view of the first week:
        determining whether the particular day is in the week preceding the first week;
        in accordance with a determination that the particular day is in the week preceding the first week, displaying a sixth week in the week view, wherein the sixth week starts on the particular day; and,
        in accordance with a determination that the particular day is not in the week preceding the first week, displaying a seventh week in the week view, wherein the seventh week starts on the predefined first-day-of-the-week of the week preceding the first week.

4. The method of claim 1, wherein the selection of the particular day is received from a module running on the computer system that determines a current day.

5. The method of claim 1, wherein the selected day corresponds to the current day.

6. The method of claim 1, wherein the selected day corresponds to a user-selected day-of-the-week.

7. An electronic device, comprising:
    a display;
    one or more processors;
    memory; and
    one or more programs, wherein the one or more programs are stored in the memory and configured to be executed by the one or more processors, the one or more programs including instructions for:
        displaying a first week in a week view of a calendar on a display of the computer system, including a first boundary day for the first week, wherein the week view displays three or more sequential days;
        receiving a selection of a particular day in the first week;
        while displaying the first week, receiving an input to advance the week view of the calendar; and,
        in response to receiving the input to advance the week view of the calendar, advancing the week view of the calendar by an amount that is determined based on which day of the week was selected in the received selection of the particular day, wherein the advancing includes:
            in accordance with a determination that the particular day is the first boundary day, displaying a second week in the week view of the calendar, distinct from the first week, wherein the second week comprises a second boundary day that corresponds to a same day-of-the-week as the first boundary day; and
            in accordance with a determination that the particular day is not the first boundary day, displaying a third week in the week view of the calendar, wherein the third week comprises a third boundary day that is the particular day;
        wherein a respective boundary day corresponds to the day-of-the-week displayed first in a sequence of days displayed in the week view in the calendar.

8. The electronic device of claim 7, further including instructions for:
    while displaying the first week, receiving an input to reverse the week view of the calendar; and
    in response to receiving the input to reverse the week view:
        determining whether the particular day is displayed as the first day in the week view of the first week;
        in accordance with a determination that the particular day is displayed as the first day in the week view of the first week:

determining whether the particular day corresponds to a predefined first day-of-the-week;

in accordance with a determination that the particular day corresponds to the predefined first day-of-the-week, displaying a fourth week in the week view, wherein the fourth week is one week earlier than the first week and starts on the same day-of-the-week as the particular day;

in accordance with a determination that the particular day does not correspond to the predefined first day-of-the-week, displaying a fifth week in the week view, wherein the fifth week starts on the predefined first day-of-the-week preceding the particular day.

9. The electronic device of claim 8, further including instructions for:

in response to receiving the input to reverse the week view, in accordance with a determination that the particular day is not displayed as the first day in the week view of the first week:

determining whether the particular day is in the week preceding the first week;

in accordance with a determination that the particular day is in the week preceding the first week, displaying a sixth week in the week view, wherein the sixth week starts on the particular day; and, in accordance with a determination that the particular day is not in the week preceding the first week, displaying a seventh week in the week view, wherein the seventh week starts on the predefined first-day-of-the-week of the week preceding the first week.

10. The electronic device of claim 7, wherein the selection of the particular day is received from a module running on the computer system that determines a current day.

11. The electronic device of claim 7, wherein the selected day corresponds to the current day.

12. The electronic device of claim 7, wherein the selected day corresponds to a user-selected day-of-the-week.

13. A non-transitory computer readable storage medium storing one or more programs, the one or more programs comprising instructions, which when executed by an electronic device with a display, and a touch-sensitive surface, cause the device to:

display a first week in a week view of a calendar on a display of the computer system, including a first boundary day for the first week, wherein the week view displays three or more sequential days;

receive a selection of a particular day in the first week;

while displaying the first week, receive an input to advance the week view of the calendar; and, in response to receiving the input to advance the week view of the calendar, advance the week view of the calendar by an amount that is determined based on which day of the week was selected in the received selection of the particular day, wherein the advancing includes:

in accordance with a determination that the particular day is the first boundary day, display a second week in the week view of the calendar, distinct from the first week, wherein the second week comprises a second boundary day that corresponds to a same day-of-the-week as the first boundary day; and in accordance with a determination that the particular day is not the first boundary day, display a third week in the week view of the calendar, wherein the third week comprises a third boundary day that is the particular day;

wherein a respective boundary day corresponds to the day-of-the-week displayed first in a sequence of days displayed in the week view in the calendar.

14. The non-transitory computer readable storage medium of claim 13, further including instructions that cause the device to:

while displaying the first week, receive an input to reverse the week view of the calendar; and in response to receiving the input to reverse the week view:

determine whether the particular day is displayed as the first day in the week view of the first week;

in accordance with a determination that the particular day is displayed as the first day in the week view of the first week:

determine whether the particular day corresponds to a predefined first day-of-the-week;

in accordance with a determination that the particular day corresponds to the predefined first day-of-the-week, display a fourth week in the week view, wherein the fourth week is one week earlier than the first week and starts on the same day-of-the-week as the particular day;

in accordance with a determination that the particular day does not correspond to the predefined first day-of-the-week, display a fifth week in the week view, wherein the fifth week starts on the predefined first day-of-the-week preceding the particular day.

15. The non-transitory computer readable storage medium of claim 14, further including instructions that cause the device to:

in response to receiving the input to reverse the week view, in accordance with a determination that the particular day is not displayed as the first day in the week view of the first week:

determining whether the particular day is in the week preceding the first week;

in accordance with a determination that the particular day is in the week preceding the first week, displaying a sixth week in the week view, wherein the sixth week starts on the particular day; and, in accordance with a determination that the particular day is not in the week preceding the first week, displaying a seventh week in the week view, wherein the seventh week starts on the predefined first-day-of-the-week of the week preceding the first week.

16. The non-transitory computer readable storage medium of claim 13, wherein the selection of the particular day is received from a module running on the computer system that determines a current day.

17. The non-transitory computer readable storage medium of claim 13, wherein the selected day corresponds to the current day.

18. The non-transitory computer readable storage medium of claim 13, wherein the selected day corresponds to a user-selected day-of-the-week.

* * * * *